United States Patent [19]
Boyle et al.

[11] Patent Number: 6,119,167
[45] Date of Patent: Sep. 12, 2000

[54] PUSHING AND PULLING DATA IN NETWORKS

[75] Inventors: Stephen S. Boyle, Fremont; Peter F. King, Half Moon Bay; Bruce K. Martin, Jr.; Alain S. Rossmann, both of Palo Alto; Bruce V. Schwartz, San Mateo, all of Calif.

[73] Assignee: Phone.Com, Inc., Redwood City, Calif.

[21] Appl. No.: 08/977,572

[22] Filed: Jul. 11, 1997

[51] Int. Cl.[7] .................................................. G06F 15/16
[52] U.S. Cl. ........................... 709/234; 709/235; 709/203
[58] Field of Search ..................... 709/203, 218, 709/219, 216, 228, 229, 234, 235, 245; 707/203

[56] References Cited

U.S. PATENT DOCUMENTS

| | | | |
|---|---|---|---|
| 5,727,159 | 3/1998 | Kikinis | 709/246 |
| 5,734,898 | 3/1998 | He | 707/203 |
| 5,802,299 | 9/1998 | Logan et al. | 709/218 |
| 5,842,216 | 11/1998 | Anderson et al. | 709/203 |
| 5,850,517 | 12/1998 | Verkler et al. | 709/203 |
| 5,852,717 | 12/1998 | Bhide et al. | 709/203 |
| 5,861,883 | 1/1999 | Cuomo et al. | 709/203 |

FOREIGN PATENT DOCUMENTS

WO 97/08906  3/1997  WIPO .

OTHER PUBLICATIONS

"An Exploration of Dynamic Documents", Netscape Communications Corporation, 1996.

*Primary Examiner*—Zarni Maung
*Assistant Examiner*—Philip B. Tran
*Attorney, Agent, or Firm*—Skjerven, Morrill, MacPherson, Franklin & Friel LLP; Michael Shenker

[57] ABSTRACT

Data are pushed from a source to a destination via an intermediate computer system. If the intermediate computer system is unable to forward the pushed data to the destination for a predetermined length of time, the intermediate system deletes the pushed data and never forwards the data to the destination. According to another aspect, the intermediate system receives a command, e.g. from a server originating the data, to delete the data if the data has not yet been forwarded to the destination. According to another aspect, the intermediate system receives data whose identifier (e.g. source URL) matches an identifier of data pushed earlier to the same destination but not yet forwarded. The intermediate system deletes the earlier pushed data and never forwards the earlier pushed data.

17 Claims, 13 Drawing Sheets

Microfiche Appendix Included
(25 Microfiche, 1323 Pages)

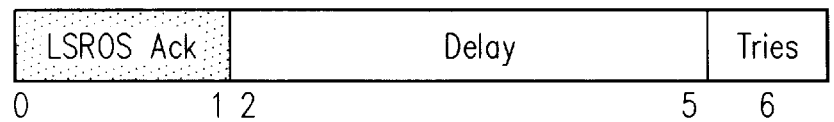
FIG. 22
FIG. 23
| byte 0 | Not Used | 0 1 0 0 |
|---|---|---|
| byte 1 | Reference ID ||
| byte 2 | Failure Value ||
FIG. 24
| byte 0 | Not Used | 0 1 0 1 |
|---|---|---|
| byte 1 | Reference ID ||
FIG. 25

PUSHING AND PULLING DATA IN NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

APPENDICES

The application includes Appendices, 1, 2, 3, 4, 5, 6, A1, A2, B, C, D, E, F, and G. Appendices B, C, D, E, F, and G are microfiche appendices. Appendix B contains one sheet of microfiche, 7 frames. Appendix C contains one sheet of microfiche, 13 frames. Appendix D contains one sheet of microfiche, 3 frames. Appendix E contains two sheets of microfiche, 151 frames total. Appendix F contains Sections 1, 2 and 3. Section 1 contains seven sheets of microfiche, 421 frames total. Section 2 contains seven sheets of microfiche, 421 frames total. Section 3 contains four sheets of microfiche, 196 frames total. Appendix G contains two sheets of microfiche, 111 frames total.

BACKGROUND OF THE INVENTION

The present invention relates to networks, and more particularly to pushing and pulling data over networks.

A network client receives data from a server by means of a push or a pull. In a pull, the client requests data from the server. In a push, the server sends data to the client without the client requesting the data.

An example is provided by a World-Wide Web (WWW) browser Netscape Navigator, version 1.1, available from Netscape Communications Corporation of California. See the WWW document http://www.netscape.com/assist/net_sites/pushpull.html. This browser runs on a client network station. With this browser, the client can pull data from a server. Alternatively, the client can allow the server to push data. To allow the push, the client opens a network connection (TCP/IP connection) to the server and leaves the connection open. The server pushes data over the connection. The server can push new data blocks any time. The connection stays open. The pushed data are immediately displayed by the browser.

It is desirable to provide push and pull techniques that would make it faster for the client to access data from the server and would reduce the use of network resources.

SUMMARY OF THE INVENTION

The present invention provides a method for processing data pushed over a network from a data source or sources to a data destination or destinations via a computer system intermediate between the source or sources and the destination or destinations, wherein the intermediate computer system communicates with the source or sources and destination or destinations over the network, the method comprising the intermediate computer system receiving data being pushed from a data source to a data destination DE1 if the intermediate computer system is unable to forward the pushed data to the destination DE1 for a predetermined length of time, then the intermediate computer system deleting the pushed data and never forwarding the pushed data to the destination DE1.

In some embodiments, the method further comprises the destination DE1 pulling the data that has been pushed to the destination but deleted at the intermediate computer system.

In some embodiments, the destination DE1 is a mobile device.

The present invention provides a method for processing data pushed over a network from a source or sources to a destination or destinations via a computer system intermediate between the source or sources and the destinations, wherein the intermediate computer system communicates with the source or sources and destination or destinations over the network, the method comprising: the intermediate computer system receiving data being pushed to a destination DE1; the intermediate computer system receiving a command to delete the data if the data has not yet been forwarded to the destination DE1; if the data has not yet been forwarded to the destination DE1, then the intermediate computer system deleting the data and never forwarding the data to the destination DE1.

In some embodiments, wherein the command is received over the network from a source that was pushing the data.

The present invention provides a method for processing data pushed over a network from a source or sources to a destination or destinations via a computer system intermediate between the source or sources and the destination or destinations, wherein the intermediate computer system communicates with the source or sources and destination or destinations over the network, the method comprising: the intermediate computer system receiving data DA1 being pushed to a destination or destinations, wherein the pushed data DA1 includes an identifier identifying a source of the pushed data; if the identifier of the pushed data DA1 matches an identifier of data pushed earlier to the same destination or destinations but not yet forwarded to at least one of its destination or destinations, then the intermediate computer system deleting the earlier pushed data and never forwarding the earlier pushed data to the destination or destinations.

In some embodiments, the data DA1 is a more recent version of the earlier pushed data.

The present invention provides a method for operating a server to provide data over a network, the method comprising: the server pushing data to a data destination or destinations by sending the data over the network to an intermediate computer system which is to forward the data over the network to the data destination or destinations; and the server sending a command to the intermediate computer system to delete data which the server pushed earlier, the command being a command to delete the data if the data has not yet been forwarded to its destination.

In some embodiments, at least one of the destinations whose data are to be deleted if not yet forwarded is a mobile device.

The present invention provides a server programmed to perform the following operations: pushing data to a data destination or destinations by sending the data over a network to an intermediate computer system which is to forward the data over the network to the data destination or destinations; and sending a command to the intermediate computer system to delete data which the server pushed earlier, the command being a command to delete the data if the data has not yet been forwarded to its destination.

The invention also provides suitable computer circuitry and computer readable media.

The present invention provides push and pull techniques that reduce the use of network resources and make it faster for the client to access data from the server. In particular, in some embodiments, the client does not have to keep a connection open to allow pushes. Data can arrive at the client not over any connection opened by the client, but over a connectionless link (i.e. as datagrams), or over a connection opened by the server or some intermediate station, or over a combination of connectionless links and connections opened by the server and/or an intermediate station or stations. If connection links are used, the connections can be closed after transmitting the pushed data. Therefore, the use of connections, which are valuable resources in some networks, is reduced.

Further, the client maintains a data cache for caching both pushed and pulled data. Pushed data are stored in the cache, but are not necessarily provided to the user immediately. Rather, the pushed data are provided to the user when the user requests the data. Thus, the server can push data in advance of the user requesting the data. When the user requests the data, the data are already in the cache. Hence, the data are accessed faster. Further, the user sees no difference between the pushed and pulled data with the exception of latency—the pulled data take longer to access if the data are not already in the cache.

In some embodiments, the cache is maintained on a least-recently-used (LRU) basis.

Reduced latency makes the invention suitable for wireless networks which often have higher latency than wired networks. In some embodiments, clients are handheld devices, for example, cellular telephones. The cellular telephones run WWW browsers which use wireless communication links to communicate with link stations connected to the Internet. Link stations provide browser proxy services to the telephone browsers. To push data to a browser, a WWW server opens a TCP/IP connection to a link station, pushes data to the link station, and closes the connection. The link station pushes the data to the phone browser over a connectionless protocol or a connection opened by the link station. If the link station uses a connection, the link station closes the connection after transmitting the data.

The invention also provides a client simulator to help developers to develop computer systems. In a client simulator, the link station functions are performed by the client simulator In some embodiments, a client is a desktop computer or some other stationary computer. In other embodiments, the client is a laptop, a notebook, or some other computer.

A user is a human user and/or an application executed on a client.

Other embodiments and variations are within the scope of the invention. The invention is defined by the appended claims.

BRIEF DESCRIPTION OF THE DRAWINGS

FIG. 22 is a schematic diagram of the structure of a Reply Acknowledgment PDU.

FIG. 23 is a schematic diagram of the structure of a Holdon PDU.

FIG. 24 is a schematic diagram of the structure of a LSROS Failure PDU.

FIG. 25 is a schematic diagram of the structure of a Cancel PDU.

FIG. 30 is a schematic diagram of a typical SUGP protocol at pwer on.

DESCRIPTION OF PREFERRED EMBODIMENTS

Figure 1:
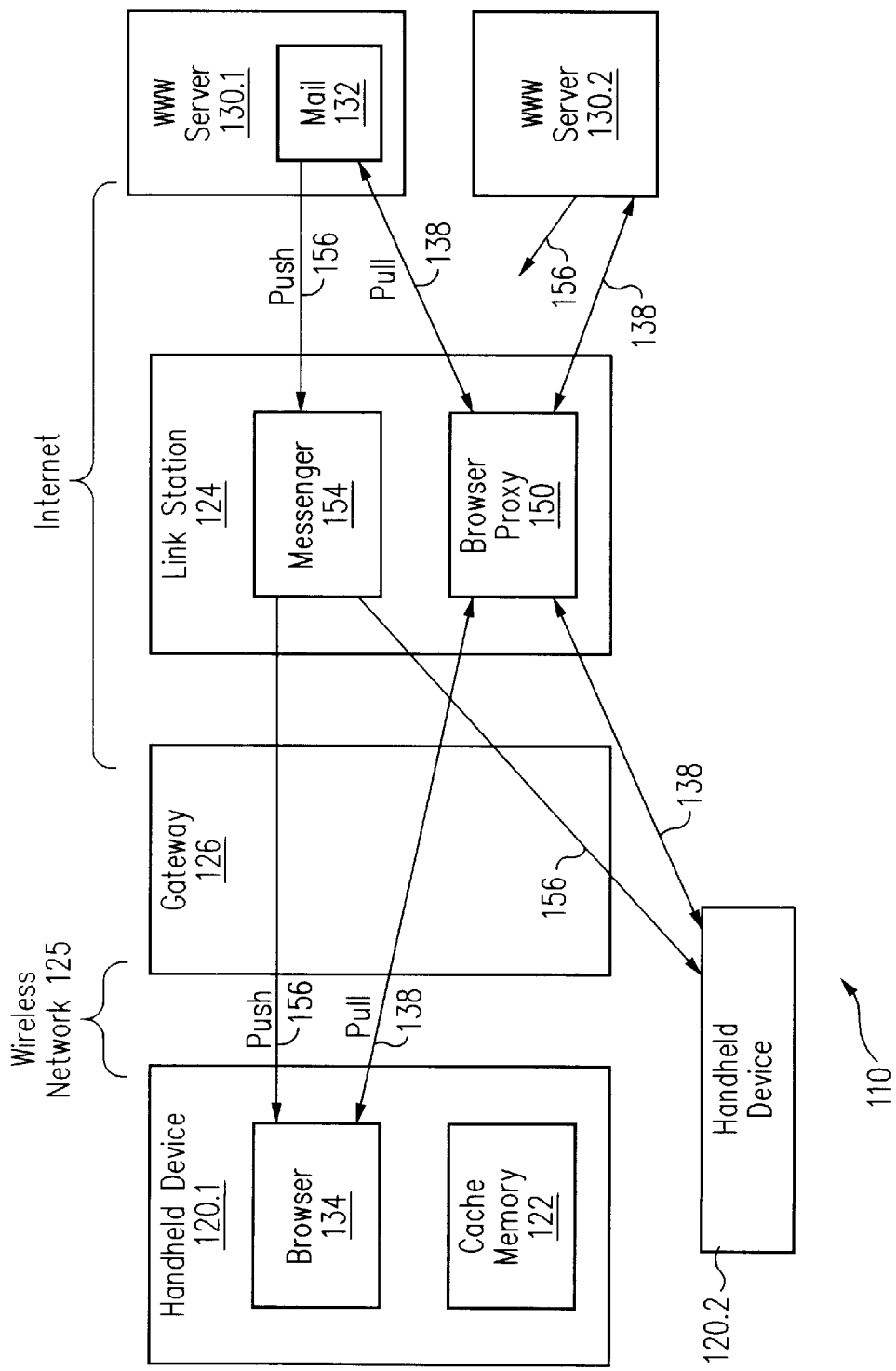
FIG. 1 is a block diagram of a network according to the present invention.

FIG. 1 illustrates a network 110 in which clients 120.1, 120.2 can each perform both push and pull operations. Each client 120 has a cache memory 122 for caching both pushed and pulled data. Client computer system 120.1 is shown in detail. System 120.2 is similar, and its details are omitted for simplicity.

In some embodiments, each system 120 is a handheld device, for example a cellular phone, a portable computer, or some other computer system. Each device 120 communicates with a link station 124. Each device 120 is connected to a wireless network 125 and the Internet. Link station 124 is connected to the Internet. Gateway 126 connects the wireless network 125 to the Internet. In some embodiments, wireless network 125 is CDPD (Cellular Digital Packet Data), GSM, or some other network. CDPD is described, for example, in J. Agosta and T. Russell, "CDPD: Cellular Digital Packet Data Standards and Technology" (1997) incorporated herein by reference. See also R. A. Dayem, "Mobile Data & Wireless Lan Technologies" (1997) which described both CDPD and GSM and is incorporated herein by reference. In some CDPD embodiments, gateway 126 is MD-IS.

In some embodiments, handheld devices 120 communicate with link station 124 over a connectionless protocol such as UGP (UP.Link Gateway Protocol), SUGP (Secure UP.Link Gateway Protocol, See Appendix A2) or HDTP (Handheld Device Transport Protocol).

In some embodiments, different devices 120 communicate with different stations 124.

Network 110 includes Wide-World Web (WWW) server stations 130.1, 130.2 connected to the Internet, and perhaps other such servers. Server 130.1 runs an electronic mail service application 132.

In some embodiments, one or more of devices 120 are connected to the Internet directly and not through gateway 126. Further, in some embodiments, one or more devices 120 are non-mobile systems. In some embodiments, devices 120 and link station 124 are combined in one entity used as a phone simulator. The entity is connected to the Internet. The phone simulator helps developers to develop the cellular telephones and link stations.

Each device 120 includes a display (not shown) and a data entry device (not shown) such as a keyboard, a keypad, a mouse, or some other device. In addition, device 120 includes a speaker capable to play audio hypermedia data. Each device 120 may include a computer processor (not shown). The computer processor can execute a browser 134 (see Appendix A1 for one embodiment of browser 134) which can display HDML files. HDML (Handheld Device Markup Language) is a hypermedia language which is a trimmed-down version of HTML (hypertext markup language). HDML is not a markup language, but is similar to HTML. HDML is suitable for systems having little memory.

HDML has two forms: a human readable ASCII textual form and a binary tokenized form. The binary tokenized form takes less space than the textual form. Thus, the binary tokenized form is more suitable for those devices 120 which have little memory. The binary tokenized form is also suitable for high latency and/or low bandwidth networks such as CDPD. The binary tokens are defined in Appendix B.

Browser 134 includes a cache management system (not shown) for managing cache 122. Some source code for the cache management system is shown in Appendix E. Browser 134 also includes an HDML engine (not shown) for receiving hypermedia data from the cache (through the cache management system) or over a network and for displaying the video portion of the hypermedia data on the screen and for playing the audio portion of the hypermedia data over the speaker. In some embodiments, the browser cannot play audio data except possibly that the browser can make device 120 beep.

Appendix 1 describes push, pull, and other operations performed by a browser 134 executed by a device 120, for example, device 120.1. These operations are described on an example of a mail service 132. However, the invention is not limited to a browser or electronic mail. Further, device 120 can perform the push, pull and caching operations on data received from multiple servers 130 running different services. For example, in some embodiments, some of the servers run applications providing stock reports, news messages, weather reports, or traffic reports to devices 120. Other server applications manage bookmarks for browser 134 and other such browsers. All the data from mail service 132 and the stock and bookmark applications and other services are cached in cache memory 122 as described below.

Appendix 1 is self-explanatory, but we will clarify some steps now.

Browser 134 executes an event loop. This means that the browser waits for an event to occur, and then processes the event. The pull operation includes steps BrA, BrB in Appendix 1. When a user of browser 134 requests data by selecting a URL, the browser 134 executes step BrA. Examples of user requests (pull requests) include, but are not limited to, requests for a mail message or a header list of all messages in the user's mailbox. Browser 134 checks whether the data is in cache memory 122 (step BrA1). If the data is not in cache memory 122, browser 134 sends a pull request to browser proxy 150 (step BrA3). Proxy 150 is an application running on link station 124. The data pull path is shown at 138.

Pseudocode for browser proxy 150 is given in Appendix 2. Proxy 150 translates the request into an HTTP GET request, and sends the HTTP GET request to mail service 132 over the Internet using the TCP protocol (step Proxy2). When forming the GET request, the browser proxy 150 inserts an HTTP request header which includes a user identification, for example, a telephone number of the cellular phone 120.

HTTP version 1.1 allows browser proxy 150 to submit multiple requests over a single TCP connection. In some embodiments, browser proxy 150 sends multiple requests for the same or different users over a single TCP connection.

Mail service 132 sends a response to browser proxy 150 over the Internet. The response is an HDML file in the textual form. Communications between browser proxy 150 and mail service 132 use the HTTP protocol on top of the TCP Internet protocol.

Browser proxy 150 compiles the response into binary form (step Proxy4), and sends the response to browser 134 over the Internet and the wireless network 125 (steps Proxy5–Proxy6).

A server 130 can push data to browser 134 via messenger 154. Messenger 154 is an application running on link station 124. Pseudocodes for the messenger are shown in Appendix 3.

The data push path is shown at 156 in FIG. 1. When mail service 132 receives a new mail message for the user of the device 120.1, service 132 pushes two notifications to messenger 154 (steps NM2, NM3 in Appendix 4 which shows pseudocode for mail service 132). One notification includes at least a portion of the new message. The other notification includes at least a portion of a new header list. Each notification is pushed to messenger 154 over a separate TCP/IP connection. When the server sends the notification, the server closes the TCP connection. In some embodiments, the server sends both notifications over a single connection. In some embodiments, the new message (or a portion thereof) and the new header (or its portion) are sent as multiple data decks in a single notification. A format for sending multiple data decks in a single notification is described below.

Some embodiments can send multiple notifications to different users over a single connection. An example is a stock quote service pushing the price of a selected stock when the price changes. Instead of opening and closing a separate connection for each user using the stock service, the server sends the notifications for multiple users over a single connection to messenger 154.

In some embodiments, the notifications are sent via the HTTP protocol. In other embodiments, the notifications use a remote procedure call (RPC) protocol running on top of the TCP or UDP Internet protocols. In one embodiment, the RPC protocol is the Sun RPC also known as ONC (Open Network Computing). This protocol was developed by Sun Microsystems, Inc. of Mountain View, Calif.

If needed, messenger 154 compiles the HDML data in the notification into the binary form (step M2 in Appendix 3). Then messenger 154 sends the notification to browser 134 (step M4).

Browser 134 caches the data contained in the notification (step BrB6). If cache 122 contains an earlier version of the data (for example, a previous header list), the earlier version is deleted.

Figure 2:
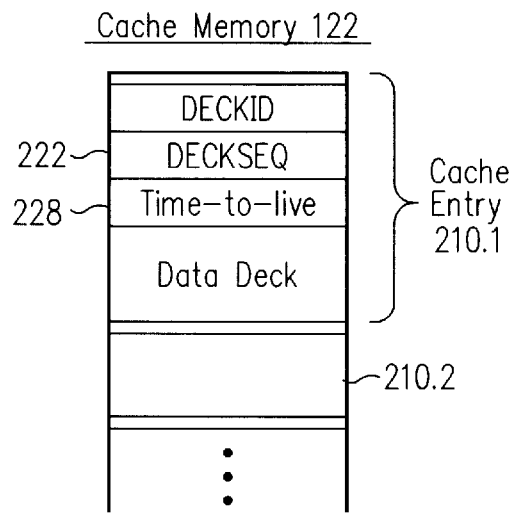
FIG. 2 is a block diagram of a cache memory according to the present invention.

FIG. 2 illustrates cache memory 122. The memory contains a number of entries 210.1, 210.2, etc. Only entry 210.1 is shown in detail. In addition to data deck 214 (data contents), the entry contains DECKID 218, DECKSEQ 222, and time-to-live 228. Some embodiments include additional fields, for example, a data type.

Deck ID 218 is a globally unique identifier of the deck. In some embodiments, deck ID 218 is a URL. An example is http://www.mail.com/cgi-bin/mail.exe?h for a header list, or http://www.mail.com/cgi-bin/mail.exe?msgid=32 for a mail message.

In some embodiments, mail service 132 breaks messages into blocks of 200–400 bytes. Each block is made a separate deck. The deck is assigned a URL which includes the message URL and the offset of the block from the beginning of the message. An example of a deck ID for a message block at offset 200 is http://www.mail.com/mail.exe?msgid=32&offset=200.

If the deck is not the last deck of the message, the deck is terminated with a hypertext link "more" associated with the URL of the next deck of the message.

Similarly, a header list is broken into decks of at most 10 lines each. Each block is a separate deck. If a header includes more than one deck, each deck (except possibly the first one) is identified by an offset parameter in the URL. Each deck except the last one is terminated with a "more" link to the next deck.

Deck sequence, or version, 222 is a sequence number allowing browser 134 to determine which version of the data is more recent. The browser may receive the same kind of data (for example, the header list) through the pull request to browser proxy 150 and through the push from messenger 154. A more recent version of the data may arrive before a less recent version. The browser uses the deck sequence 222 to discard the less recent version. See step BrB4 in Appendix 1.

In some embodiments, the sequence number is assigned by the WWW service (such as mail service 132). In other embodiments, the sequence number is assigned by link station 124 as described in more detail below.

Time-to-live (TTL) 228 is specified by the WWW service (for example, mail service 132). TTL is specified in seconds or some other time units. If the time-to-live has expired, the browser will not use the cached deck but will pull the data from the server.

In some embodiments, a special TTL value is reserved for an infinite time-to-live. In some embodiments, TTL 228 is 16 bits long, and the special TTL value for the infinite time-to-live is hexadecimal FFFF.

The browser maintains a global state indicating the current deck being processed.

When browser 134 detects a network event indicating the receipt of the RequestReply PDU from proxy 150, browser 134 executes the step BrB (Appendix 1).

The sub-steps BrB1–BrB7 of step BrB are executed for each deck in the PDU. If the user is pulling a message or a header list, the PDU will contain only one deck. If the user is pulling all his new mail, the PDU will contain two deck in some embodiments. The first deck is a header list (or a block of the first ten lines of the header list). The second deck is one of the new messages (or a portion of a new message).

At step BrB3, browser 134 determines the URL of the deck. In some cases, the deck's URL is the URL that was sent by the browser at step BrA3 with the pull request. This is the case, for example, when the pull request was generated in response to the user selecting a URL of a header list or a message from a header list, or clicking on "more" at the end of a deck representing a portion of a message or a header list.

In some cases, an entirely new URL is assigned to the deck at step BrB3. One such case is when the user selected a URL associated with new mail. As stated above, service 132 returns two decks. The header list deck has the URL of the header (or a portion of the header). The message deck has the URL of a message (or a portion of a message). These URLs are attached to the respective deck by mail service 132.

At step BrB4, the browser determines if the deck should be ignored due to its sequence number DECKSEQ. A separate sequence number is generated by mail service 132 for each user mailbox. For each mailbox, mail service 132 increments the sequence number whenever the set of messages in the mailbox changes, for example, when a message is received or deleted (see, for example, step NM1 in Appendix 4). If mail service 132 did not specify any sequence number for the deck, the deck is not ignored by browser 134 (step BrB4–1), i.e. the deck will be used by the browser.

At step BrB4–3, deck sequence numbers are compared as shown in the C programming language code of Appendix D. More particularly, the old deck's sequence number is subtracted from the new deck's sequence number.

Each sequence number is a 16-bit unsigned integer. To accommodate wrap-around, the difference of the sequence numbers is treated as a two's complement signed 16-bit integer. If this integer is positive, the old deck is considered older than the new deck. If this integer is negative, the new deck is considered older. If the integer is 0, the sequence numbers of the two decks coincide.

Notifications are handled as follows. When messenger 154 receives a notification from a server 130, the messenger queues the notification in a queue allocated for the destination device 120 (step M3 in Appendix 3). A separate queue is kept for each browser 134. If the notification includes HDML data, the messenger compiles the data into binary form (step M2). Of the two notification types described below, the DataPush includes HDML data, and the InvalService (invalidate service) does not.

If the queue for browser 134 is not empty, the messenger periodically tries to contact the browser. When the browser is contacted, the messenger sends all the notifications in the queue to the device over UGP or HDTP.

One embodiment of notification type data structures and other data formats and programmatic interfaces used by browser 134 and link station 124 to communicate via UGP is described in the C programming language header file reproduced in Appendix C.

A DataPush notification entry in a messenger queue (after compiling of the HDML data) has the following form:

1) One byte includes the number of URL/TIL pairs in the entry. TIL is a binary tokenized HDML deck identified by the URL.

2) One byte includes flags. Flags indicate "side-effects" the browser should perform on receipt of the data. The "side effects" may include causing the device 120 to beep, to play a tone, to vibrate, to flash a light, etc. In another embodiment, the flags are replaced by an alert entity which contains a one-line textual description of the activity that caused he "side effect".

3) For each URL/TIL pair, the entry has the following fields:

3A) A variable length field includes the URL string (null terminated).

3B) Two bytes indicate the length of the TIL data deck.

3C) A variable length field contains the TIL data deck.

In addition, for each URL/TIL pair the notification may include a sequence number DECKSEQ and a time-to-live.

When the browser receives a DataPush notification, the browser performs the step BrC (Appendix 1).

Step BrCacheInsertion in Appendix 1 is a routine invoked to insert a new deck into the cache. This routine is invoked, for example, at steps BrB6, BrC4.

The InvalService (invalidate service) notification is sent by a server 130 to invalidate one or more cache entries. In response, browser 134 performs step BrD (Appendix 1). One form of the invalidate service notification is "invalidate-specific-ID". This notification includes a single URL. The browser 134 invalidates the cache entry having this URL. Another form of the invalidate service notification is "invalidate-matching-ids." In this form, only a portion of the URL is specified, for example, the beginning (prefix) portion. In response, browser 134 invalidates any cached entries with URLs having a matching portion.

In some mail applications, invalidate service (InvalService) notifications are issued by mail service 132 when the mail server receives a new message for a user of a device 120. Before pushing the new header list, the mail service pushes an invalidate service notification to invalidate any cached portions of the header list. Further, in some embodiments, the mail service invalidates the cached header list entries but does not push the new header list. When the user requests a header list, the browser will pull the header list from the mail service 132 because the header list entries previously cached have been invalidated. In some embodiments, the header list is not pushed because the push path 156 goes over a more expensive network than the pull path 138. In other embodiments, header lists are not pushed to reduce the amount of data transmitted. The amount of data is reduced because the user gets the header list only when the user wishes to see it.

In another embodiment, browser 134 allows the user to specify preferences including, for example, a particular time zone. The dates and times in the mail messages are referenced to the time zone specified by the user. If the user changes the time zone (because, for example, the user moves to a different time zone), server 132 is notified by link station 124. When mail service 132 learns of the time zone change, mail service 132 pushes an invalidate-service notification to invalidate all the mail messages in cache memory 122. (Of note, cache memory 122 may include other data besides the mail messages. The other data may be supplied by other services.) Hence, cache 122 will be rid of the mail messages that include the dates and times referenced to a previous time zone.

In another embodiment, browser 134 caches a bookmark list in cache memory 122. A bookmark application runs on a server 130 and services the requests to edit the bookmark list. If the user edits the bookmark list, the browser informs the bookmark application, and the bookmark application pushes an invalidate service notification to invalidate all the bookmarks in cache memory 122.

In some embodiments, messenger 154 assigns a time-to-live parameter MTTL (messenger time-to-live) to each notification received by the messenger. The MTTL may be different from the time-to-live assigned by servers 130 and used for cache 122. If a notification has been in a messenger queue longer than MTTL and the messenger has not been able to send the notification to the respective browser 134, the messenger deletes the notification from the messenger queue. Thus, if multiple header lists have been pushed by service 132 while the user device 120 was off, the header lists not delivered by the messenger for time MTTL will be deleted. The probability that outdated header lists will be pushed to device 120 will therefore be reduced.

In some embodiments, a server 130 may push a command to messenger 154 to delete one or more notifications from the messenger queues if the notifications have not been delivered to the browsers.

In some embodiments, for each data push notification, the messenger 154 deletes any undelivered notifications that have the same URL and are destined for the same browser 134.

In some embodiments, a stock application on a server 130 sends stock prices to devices 120. A user may request the stock application (via the pull path 138) to push the price of a given stock when the price gets above or below a certain value. Alternatively, the user may request the application (via the pull path) to push the price at regular intervals of time, for example, every hour. In some embodiments, the stock application pushes the stock price via the SMS whenever the stock price changes. SMS stands for Short Message Service. This service is inexpensive or free in some networks.

In some embodiments, browser 134, messenger 154, browser proxy 150, and mail service 132 are products of Unwired Planet, Inc. of Redwood Shores, Calif. Devices 120 are model MA210 cellular phones available from Mitsubishi or model Duette cellular phones available from Samsung. Browser 134 is stored in the ROM of devices 120. The browser size is 60–130 KBytes.

The cellular phone also has 20–26 Kbytes of RAM of which about 14–20 Kbytes are used for cache 122. The RAM is non-volatile due to a built-in battery power source.

In some embodiments, the sequence numbers (DECKSEQ) are generated not by servers 130 but by link stations 124. A separate sequence number is kept for each browser 134. Station 124 increments the sequence number for each deck received for browser 134 by proxy 150 or messenger 154, and attaches the sequence number to the deck. Browser 134 discards any data, whether pushed or pulled, that have a lower sequence number than any data previously received by the browser even if the previously received data have a different URL.

The advantage of this approach is removing the need for each server application (for example, mail service 132) to maintain deck sequence numbers. The disadvantage is that the browser 134 may unnecessarily discard pushed data. For example, suppose email server 132 pushes a new message, and the message is given a sequence number 100 by the link station. Then the user pulls a stock quote from another service, and the stock quote gets sequence number 101. If the browser receives the stock quote before the email message, the browser will discard the email message. However, this disadvantage is minimized if the data push path 156 has low latency. Indeed, if the latency is low, the probability is small that pushed data having a lower sequence number than pulled data is received by browser 134 after the pulled data.

Further, in some such embodiments, the servers 130 do not push any DataPush notifications to the browsers. Instead, the servers 130 push only the URL of new data to messenger 154. The messenger queues the URL but does not push the URL to the browser. Instead, the messenger pushes to the browser a notification that a new URL has been received. Then browser 134 issues a pull request to browser proxy 150. Browser proxy 150 gets the new URL from the messenger and issues an HTTP GET request to a CGI program identified by the URL. The data returns to the browser via the pull path 138. One such embodiment is described in Appendices 5 and 6 which refer to this embodiment as version 2.0.

Such embodiments are suitable for GSM networks having an inexpensive SMS service. Indeed, since the notifications are short, they can be sent inexpensively via the SMS. (Data pull operations can use more expensive GSM links suitable for transfer of long messages.)

Balancing the latency and the cost of data access is an important issue confronting users of wireless networks. In some embodiments, the user is given explicit control over a caching strategy that determines when data should be pulled or pushed. Thus, the user is enabled to optimize the cost/latency tradeoff on a network by network, device by device, or user by user basis.

For example, if latency is high but data transport cost is low, the user may choose to have more data to be pushed to the user. Conversely, if the latency is low but the data transfer cost is high, the user may choose to pull more or all of the data.

Thus, in some embodiments, the user may request mail service 132 not to push any data. Alternatively, the user may request mail service 132 to push only invalidate notifications. Alternatively, the user may request mail service 132 to push data not more often than a given time interval. Alternatively, the user may request the mail service to push new mail notifications only when a predetermined minimum number of new messages has been received in the user mailbox, and to push invalidate service notifications according to some other policy. This is not an exhaustive list of how the user may control the push operation to optimize for the cost and latency parameters. The user issues such requests via the pull path 138.

In some embodiments, network 125 is a GSM network, and notifications from messenger 154 to browser 134 travel over SMS. Because the push notifications are inexpensive, the user may prefer to have more data pushed to the device 120.

Appendix F lists the source code of one embodiment of a browser and a link station according to the present invention. Appendix G lists the source code of one embodiment of a mail service of the present invention.

The above embodiments illustrate but do not limit the invention. In particular, the invention is not limited to the Internet, the WWW, or to browsers. In some embodiments, cache 122 is managed by a non-browser application. Cache memory 122 may include semiconductor and/or non-semiconductor memories, e.g. a disk, or any other computer store. The invention is not limited to a particular type or capabilities of devices 120. Some devices 120 include a speaker, others do not. Other embodiments and variations are within the scope of the invention, as defined by the appended claims.

APPENDIX 1

BROWSER OPERATION

The browser executes an event loop waiting for an event.

Pull Operations

BrA. Input event indicates the selection of a URL.

BrA1. The cache is searched for an entry 210 (FIG. 2) with a matching URL.

BrA2. If a matching entry is found, the respective deck 214 is made the current deck and is displayed by the browser. The browser returns to the top of the event loop to wait for the next event.

BrA3. Otherwise (no matching URL is found), the browser sends a request PDU (packet data unit) containing the selected URL via HDTP.

BrB. A network event indicates the receipt of the RequestReply PDU. This is a reply to the pull. The browser sends an Acknowledge PDU to the browser proxy 150. For each deck in the PDU, the browser performs the following:

BrB1. Copy the URL and HDML contents out of the notification PDU.

BrB2. Check the HDML contents for validity (i.e. that there is no corruption, and that the PDU format is a supported version).

BrB3. Determine a URL for the deck.

BrB4. Determine if the deck should be ignored due to its sequence number:

BrB4–1. If no sequence number is specified for the deck by the server (e.g. by mail service 132), the deck is not ignored (i.e. it will be used).

BrB4–2. If a sequence number is specified for the deck, cache 122 is searched for an entry with a URL that matches the deck's URL (this deck is called a "new" deck or a "newly received" deck below). If there is no such entry, or the entry does not have a sequence number 222, the newly received deck is not ignored.

BrB4–3. If cache 122 has an entry with a matching URL, and if both this entry and the new deck have sequence numbers, the sequence numbers are compared. If the "old" deck (the deck in the cache entry) is newer than the newly received deck, the newly received deck will be ignored. Otherwise, the newly received deck is not ignored.

BrB5. If the newly received deck is to be ignored, then SearchForCacheEntry () is called to get the old deck. This procedure returns a pointer to the TIL data (binary tokenized HDML data) so that the old deck can be displayed.

BrB6. Otherwise, if the newly-received deck's time-to-live is not specified by mail service 132, or is specified and is not 0, the newly received deck is inserted into the cache, and any old cache entries with matching URLs are deleted. If the new deck's time-to-live is zero, the new deck is not cached. However, if an old deck exists with a matching URL, the old deck is deleted.

BrB7. If the new deck's TTL is not 0, the deck in the cache entry is made the current deck, and is displayed by the browser. If the new deck's TTL is 0 and the new deck is not ignored, the new deck is displayed by the browser. Then the browser returns to the top of the event loop.

Push Operations

BrC. An event indicates the arrival of a DataPush notification. For each URL/TIL pair in the notification, the browser performs the following:

BrC1. Copy the URL and HDML contents out of the notification PDU.

BrC2. Check the contents for validity (no corruption, supported version; similar to step BrB1).

BrC3. Determine if the deck should be ignored due to its sequence number (as in step BrB4).

If so, ignore it and move on to the next deck in the entry or the next entry in the PDU (go to step BrC1), or to the top of the event loop if this is the last deck.

BrC4. The deck is not to be ignored. If its time-to-live is specified and is not 0, then insert the deck into cache 122, replacing any cache entries with a matching URL (as in step BrB5).

BrC5. If the deck has the same URL as the currently displayed deck, the deck is made the current deck and is displayed.

BrD. An event indicates the arrival of an invalidate-service notification.

For each entry in the cache, if the entry's URL matches any URL in the invalidate service notification, the cache entry is deleted from the cache.

Other Browser Operations

BrE: Update time-to-live in cache 122. An event indicates expiration of a predetermined time interval ("expiration interval") since the last updating of the time-to-live parameters in the cache. A cache expiration routine is invoked which performs the following. For each entry in the cache, if the entry's time-to-live is less than the expiration interval, the entry is deleted. Otherwise, if the entry's TTL is not FFFF (infinity), the TTL is decremented by the expiration interval. In some embodiments, the FFFF values are also decremented by the expiration interval, i.e. infinite TTLs are not allowed.

BrCacheInsertion. If there is not enough free space in the cache for the new entry, a least recently used (LRU) entry is deleted from the cache. If the new entry still does not fit, another LRU entry is deleted. This continues until enough room is freed in the cache to accommodate the new entry. The maximum deck size is selected such that the maximum size of any new entry is smaller than the size of the cache.

If time-to-live has not been specified, the time-to-live 228 (FIG. 2) is set to a default value (3 days in some embodiments).

APPENDIX 2

BROWSER PROXY

Browser proxy 150 provides a UGP to HTTP protocol gateway as follows:

Proxy1. Receive a Request PDU from a browser 134.

Proxy2. Submit an HTTP GET request to a WWW server 130 (e.g., mail service 132).

Proxy3. Receive an HTTP response (textual HDML file) from the server.

Proxy4. Compile the response into binary tokenized form and/or compress the response.

Proxy5. Send the binary tokenized HDML file to the browser in a RequestReply PDU.

Proxy6. Receive an Acknowledge PDU from the browser.

APPENDIX 3

MESSENGER

The messenger provides an RPC interface for server applications for notification submission and processing:

M1. Receive a notification from an application running on a server 130 via the Messenger RPC interface.

M2. If the notification includes an HDML file, compile the file into binary form.

M3. Queue the notification (with binary-form HDML file, if any) in a queue of notifications for a particular browser.

M4. Check periodically if the browser is connected to the wireless network. If the browser is connected, send the notifications to the browser via UGP or HDTP.

APPENDIX 4

MAIL SERVICE 132

The mail service services pull requests and performs data pushes.

If a new mail message is received, perform the following operations:

NM1. Insert the new message into the user's mailbox, and increment the user's deck sequence number.

NM2. Generate a DataPush notification including an HDML deck containing the new message (or a portion of the new message if the message is too large), and send the notification to messenger 154.

NM3. Generate a DataPush notification including an HDML deck with a new header list (or first 10 lines of the header list) and send the notification to messenger 154.

The deck sequence numbers solve the problem presented by another message arriving and the user pulling the new header list before the previously submitted data push notification arrives at browser 154.

APPENDIX 5

UP.Link Digest Format

Introduction

The UP.Link Digest is a multipart message sent to an UP.Browser (i.e. browser 134). The scenario for the creation of a digest is the HTTP service (e.g. mail service 132) replies to a GET with "multipart/mixed" content-type. The UP.Link (i.e. link station 124) converts the multipart/mixed content into a binary format understood by the UP.Browser.

This Appendix specifies:
  Content types and their conversions
  The HTTP Response headers used to create UP.Link Digests
  The binary digest format
Digest Overview
An UP.Link digest contains zero or more typed digest entry. Each entry type has an associated HTTP content-type, and binary digest entry type.
The order in which digest entries are specified is significant. When converting from HTTP to binary format, the order will be preserved. The UP.Browser will interpret each entry in the order presented.
Content Types and their Conversions
A content type can be recognized by the UP.Link and converted into another content type or subtype. For example, the UP.Link compiles HDML source into HDMLC (compiled, i.e. binary tokenized, HDML). It might also convert images into a format usable by the UP.Browser.

| Content | HTTP/MIME Media Type | Conversion | UP.Link Digest Entry Type |
|---|---|---|---|
| Alert | application/x-up-alert | none | 1 |
| Cache Operation | application/x-up-cacheop | Operation parsed | 2 |
| HDML | text/x-hdml | HDML Compiler | 3 |
| HDMLC | application/x-hdmlc | none | 3 |
| Images | image/* | Possibly convert image formats | 4 |
| Device Data | application/x-up-device | none | 5 |
| Unknown Digest Entry Type | application/x-up-digestentry | none | 6–254 |
| Unknown Media Type | */* | none | 255 |

HTTP Headers
HTTP/1.0 [RFC1945] and HTTP/1.1 [RFC2068] differ somewhat in their definition and usage of response headers. Particularly with regard to multi-part messages. This specification attempts to span both versions of the protocol by using the headers defined in HTTP/1.1 and supporting backwards compatibilty with HTTP/1.0 headers where they overlap with HTTP/1.1.
Response Headers
The entity headers of interest in the response header are:
Content-Base
  The Content-Base entity-header field may be used to specify the base URI (Uniform Resource Identifier) for resolving relative URIs within the entity. If no Content-Base field is present, its Content-Location (if that Content-Location URI is an absolute URI) or the URI used to initiate the request, in that order of precedence.
Content-Encoding
  The UP.Link will not handle any content encoding for Magellan. Content encoding will result in an error.
Content-Type
  The content-type of the response must be one of
  text/x-hdml
  application/x-hdmlc
  multipart/mixed
  All other content-types in the response header will generate an error.

Entity Headers
The entity headers of interest in the entities of a multipart/mixed message are:
Content-Length
  The content-length is not required, however there is a significant performance improvement if it is used.
Content-Location
  If the Content-Location is a relative URI, the URI is interpreted relative to any Content-Base URI provided in the response. If no Content-Base is provided, the relative URL is interpreted relative to the Request-URI.
Content-Type
  The content-types of individual entities are summarized in the table above.
Entity Content Type Parameters
Some of the entity content types used in UP.Link digests take parameters as summarized in the table below

| Entity Content Type | Parameter | Description |
|---|---|---|
| application/x-up-digestentry | type | The digest entry type of the contents. This is an unsigned integer <= 255. Example: application/x-up-digestentry; type=6 |
| application/x-up-device | name | The name of the device data. Example: application/x-up-device; name=addrbook1 |

Binary Digest Format
The purpose of the binary digest is to combine multiple items of binary data in as compact a form as possible. The format explicitly gives no consideration to byte alignment and is not padded. In the following description, a variant of the C structure syntax is used, char is a one-byte integer, short is a two-byte integer, and long is a four-byte integer. Multi-byte integers are big-endian, i.e. the bytes appear in the following order on-the-wire: <MSB> . . . <LSB>. The base URL is assumed to be known, a priori, by the browser. In the case of an interactive request, it is the requested URL. Otherwise, the base URL is assumed to be returned by the lower-level protocol.
The overall format is as follows:

```
struct digest {
    struct digest_hdr    header;
    unsigned char        entries [ ];
};
```

The format of the header is as follows:

```
struct digest_hdr {
    unsigned char    magic;        /* DIGEST_MAGIC == 0xcf */
    unsigned char    nEntries;
}
```

NEntries specifies the number of entries to follow. The maximum number of entries in one digest is 255. The generic format of an entry is as follows:

```
struct digest_entry {
    unsigned char    type;
    unsigned short   contentLength;
    unsigned char    contents [ ];
}
```

Type specifies the type of the entry (see below). ContentLength indicates the length of contents. The subsequent entry follows directly after contents. The following entry types are supported:

| | |
|---|---|
| Null | 0x00 |
| Alert | 0x01 |
| Cache Operation | 0x02 |
| HDMLC Deck | 0x03 |
| Image | 0x04 |
| DeviceData | 0x05 |
| Unassigned | 0x06-0xfe |
| Unknown | 0xff |

Null
The Null entry has no useful data, its contents will be ignored.
Alert
The Alert entry uses the generic entry format. The contents of an alert entry in the binary digest is as follows:
    type\0title\0url\0
Cache Operation
The format of the Cache Operation entry is as follows:

```
struct cacheop_entry {
    struct digest_entry    entry;
    unsigned char          opcode;
    char                   operand[ ];
}
```

Opcode should be one of the following:

| | |
|---|---|
| Reserved | 0x00 |
| Invalidate-Service | 0x01 |
| Invalidate-URL | 0x02 |
| Unassigned | 0x03-0xff |

The operand the Invalidate-Service opcode is a NULL (0x00) terminated URL prefix. All cache entries which prefix match the operand will be invalidated. The operand for the Invalidate-URL opcode is a NULL (0x00) terminated URL to invalidate. These URLs are relative to the base URL of the response.
HDMLC Decks
The format of the HDMLC deck entries is as follows:

```
struct deck_entry {
    struct digest_entry    entry;
    char                   url[ ];
    unsigned char          deck[ ];
}
```

Url is a NULL(0x00) terminated URL relative to the base URL. The contents of the deck immediately follow the terminating NULL byte. The start of the deck can be calculated as:
    url+strlen(url)+1
The length of the deck can be calculated as
    entry.contentLength−strlen(url)−1
Image
The format of the Image entry is as follows:

```
struct image_entry {
    struct digest_entry    entry;
    unsigned char          imageType;
    char                   url[ ];
    unsigned char          data[ ];
}
```

The image types are TBD.
Url is a NULL(0x00) terminated URL relative to the base URL. The image data immediately follows the terminating NULL byte. The start of the data can be calculated as
    url+strlen(url)+1
The length of the image data can be calculated as
    entry.contentLength−strlen(url)−2
Device Data
The format of the DeviceData entry is as follows:

```
struct device_entry {
    struct digest_entry    entry;
    char                   name[ ];
    unsigned char          data[ ];
}
```

Name is the null(0x00) terminated name of the data. The data immediately follows the terminating null byte. The start of the data can be calculated as:
    name+strlen(name)+1
The length of the data can be calculated as
    entry.contentLength−strlen(name)−1
Unknown
The unknown entry type is the back door for forward compatibility. The format of the unknown entry type is as follows:

```
struct unknown_entry {
    struct digest_entry    entry;
    char                   url[ ];
    char                   mimeType [ ];
    unsigned char          data[ ];
}
```

Url is the null (0x00) terminated name of the entry data relative to the base URL. MimeType starts immediately after this null byte and is null-terminated ASCII MIME type of the entry. Data starts immediately after this second null byte and is the contents of the entry. The start of mimeType can be calculated as:
    url+strlen(url)+1
The start of the data can be calculated as:
    url+strlen(url)+strlen(mimeType)+2
The length of the data can be calculated as:
    entry.contentLength−strlen(name)−strlen(mimeType)−2
Content-Specific Handling
Alerts
The body of the alert entity should be in the following format:
    type\n
    title\nuri\n Cache Operations The body of the cache operation entity contains a www-url-encoded list of key-value pairs. The following keys and values are recognized: Well-known keys and values are case-insensitive.

| Key | Value | Description |
| --- | --- | --- |
| OpCode | Invalidate URL | Invalidate the cache entry that matches the URL in the Content-Location entity header |
|  | Invalidate Svc | Invalidate all cache entries that prefix match the URL in the Content-Location entity header |

HDMLC Decks

If an uncompiled HDML deck (text/x-hdml) is presented to the UP.Link, it will be compiled into HDMLC and then inserted into the binary digest.

Security Considerations

Relative URLs

Some of the security mechanisms in browser are based on the accuracy of the URLs of cache entries. To prevent one service from spoofing another, all URLs in digest entries must be relative to the base URL of the digest.

APPENDIX 6

UP.Browser 2.0 Content-Types

Introduction

The 2.0 Version of the UP.Browser (browser 134) is capable of processing a limited number of content types. Depending whether the UP.Browser communicates with the web server via an UP.Link proxy (browser proxy 150) or not, it expects the content in either the MIME [RFC1521] message format or a binary encoded format. The UP.Link proxy converts from MIME message format to binary encoded format.

This Appendix specifies the MIME message format of the UP.Browser 2.0 content types.

Overview

In MIME format, browser content can be single message entities or a combined, "multipart/mixed", message entity. The latter is referred to as a Digest. The order in which digest entries are specified is significant. When converting from HTTP to binary format, the order will be preserved. The UP.Browser will interpret each entry in the order presented. The following content types have been defined for UP.Browser 2.0:

| Content | HTTP/MIME Media Type |
| --- | --- |
| Alert | application/x-up-alert |
| Cache Operation | application/x-up-cacheop |
| HDML | text/x-hdml |
| HDMLC | application/x-hdmlc |
| Device Data | application/x-up-device |

NOTE: It is expected an image content type will be defined.

HTTP Headers

HTTP/1.0 [RFC1945] and HTTP/1.1 [RFC2068] differ somewhat in their definition and usage of response headers, particularly with regard to multi-part messages. This specification uses the headers defined in HTTP/1.1.

For security reasons, some headers are interpreted in a restricted manner, as summarized below.

Response Headers

The restricted entity headers in the response header are:

Content-Base

The Content-Base entity header field is ignored by the UP.Browser and UP.Link in 2.0.

Content-Encoding

The UP.Browser and UP.Link will only handle the following content encodings in 2.0:

7bit

8bit binary

Content-Type

The content-type of the response must be one of the content types listed in the "Accept" request header or "multipart/mixed". If "multipart/mixed", all of the parts of the multipart message must be listed in the "Accept" header. All other content-types in the response will generate an error.

Certain UP.Browser implementations may accept content types beyond those described in this document. If so, those additional content types will be listed in the "Accept" request header.

Content-Length

The content-length is not required, however there may be a significant performance improvement if it is used.

Entity Headers

The entity headers of interest in the entities of a multipart/mixed message are:

Content-Location

For security reasons, Content-Location headers must contain relative URLs. In 2.0, the UP.Browser and UP.Link will only accept content with a URI that contains the same net_loc as the requested URI. If your application needs to return content from a different network location, HTTP redirection should be used.

Content-Type

The content-type of the entity must be one of the content types listed in the "Accept" request header. All other content-types in the response will generate an error.

UP.Browser Content Types

Specifications for the individual content types follow.

Alert (application/x-up-alert)

The alert content type embodies an indication to the user that an asynchronous event has occurred. Typically, an alert will cause the phone to beep. For example, an alert can be sent to the browser as a result of new mail arriving in an urgent inbox or a stock value reaching certain level.

The application/x-up-alert content type is formatted the same way as application/x-www—form-urlencoded. The contents of the alert are parameterized into a URL query string with the values escaped as appropriate. The alert consists of the following parameters:

| Type | The alert type specifies how the browser should signal the user that the alert has arrived. |
| --- | --- |
| Title | The title of the alert as displayed in the UP.Browser's alert inbox. |
| URL | The URL to display when the user selects the alert. The UP.Browser coalesces alerts based on the URL. If you submit a new alert with a different title but the same URL, it will overwrite any old alerts with the same URL. This allows you to have an entry in the alert inbox whose title contains current, updated information such as a stock price. |

Example

The following alert:

Type: D—

Title: New Mail URL: /?S=HP
Would be encoded as follows:
   Content-Type: application/x-up-alert
   Type=D—&Title=New+Mail&URL=%2F%3FS%3DHP Cache Operation (application/x-up-cacheop)

The cache operation content type embodies a command to the UP.Browser to manipulate the cache. Typically, an application will use this to invalidate stale data that may still be residing in the browser's cache.

The application/x-up-cacheop content type is formatted the same way as application/x-www-form-urlencoded. The contents of the cache operation are parameterized into a URL query string with the values escaped as appropriate. The cache operation consists of the following parameters:

| OpCode | The operation to perform. |
| Operand | The operand of the operation. |

The following opcodes are supported:

| OpCode | Operand | Description |
| --- | --- | --- |
| Invalidate URL | URL | This operation invalidates the entry in the cache with the matching URL. It must be an exact match |
| Invalidate Svc | URL-prefix | This operation invalidates any entries in the cache that match the operand. A simple string prefix match is done. If the URL of the cache entry prefix matches the operand, the entry is removed from the cache. |

Example
The following cache operation:
   InvalidateURL: http://up.foo.com/test.cgi?S=42
Would be encoded as follows:
   Content-Type: application/x-up-cacheop
   OpCode=InvalidateURL&Operand=httpt%3A%2F%2Fup.foo.com%2Ftest.cgi 53FS%3D42

Handheld Device Markup Language (text/x-hdml and application/x-hdmlc)

Handheld Device Markup Language comes in two forms, textual source code (HDML) and compiled binary (HDMLC). When sending HDML to the UP.Browser, use the "text/x-hdml" content type. When sending HDMLC, use "application/x-hdmlc". The bodies of the message entities are the HDML and HDMLC respectively.

Example
The following is an example of HDML content.
   Content-Type: text/x-hdml
   <HDML version=2.0>
   <DISPLAY>
   Hi, Mom!
   </DISPLAY>
   </HDML>

Device Data (application/x-up-device)

The device data content type encapsulates data to be passed to an internal device-dependent application. It is primarily used as a mechanism to transport opaque data from a web server to a built-in device application. The data is given a device-dependent name which is used by the device to determine its internal destination and content type.

The "application/x-up-device" content header has an additional parameter, "name", which is used to specify the name of the data. For example:

The body of the device data message entity is the data itself. The format of the data is totally device-dependent and is implied by the name of the data.

Example
   Content-Type: application/x-up-device;name=phonebook
   <raw data>

Security Considerations

Relative URLs

Some of the security mechanisms in the browser are based on the accuracy of the URLs of cache entries. To prevent one service from spoofing another, all URLs in digest entries must be relative to the requested URL of the digest. This applies to the Content-Location headers of HDML entries, as well as to the URLs in the CacheOp and Alert entries.

APPENDIX A1

UP.Browser Functional Specification

This appendix documents the external functional specification of the UP.Browser (browser 134).

This section covers the design and specification of the two languages, HDML and compiled (binary tokenized) HDML, used in the UP.Link system (link station 124). Differences from 1.0 client implementations are noted.

What is HDML?

HDML stands for Hand-held Device Markup Language. HDML is not a markup language but its syntax is loosely based on HTML, HperText Markup Language. HDML is a language for describing the user interaction with information in UP.Link 124. HDML is written by service providers as a way of describing the service application. It includes information both for the end user and for the server software. HDML is also generated by service providers' programs dynamically. Compiled HDML is a distillation of HDML and describes the same interactions to the actual phone device. Compiled HDML is primarily a binary tokenization of the information in HDML. However, some features are more dramatically transformed in the conversion from HDML to compiled HDML (for example, all images are in-lined in compiled HDML).

The bulk of this report is a description of HDML. In general, this description directly applied to compiled HDML by substituting compiled HDML's binary tokens for HDML's ASCII tokens. There is a conversion chart for tokens at the end. Any structural differences in compiled HDML are noted.

UP.Link Gateway Protocol

1 Connectionless UGP Overview

Figure 3:
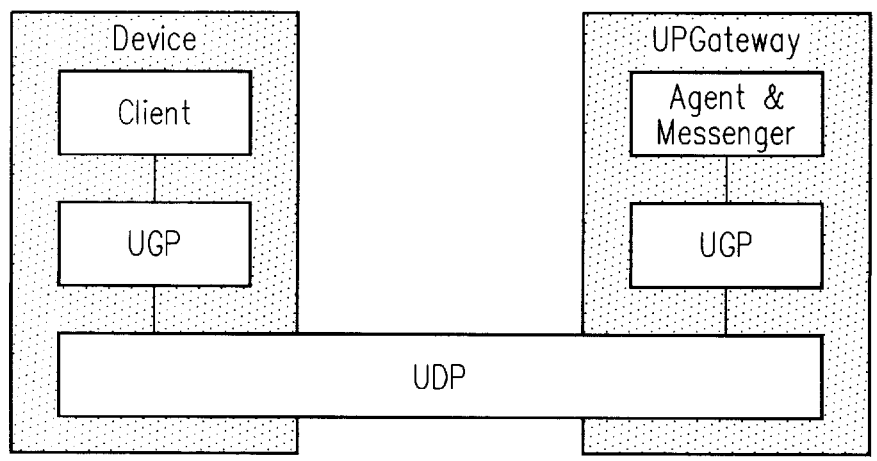
FIG. 3 is a schematic diagram of a UGP operational model.

UP.Link Gateway Protocol, UGP, is the application protocol that is used to format and interpret communications between the Client and the UP.Link. FIG. 3 is a schematic diagram of a UGP operational model. Connectionless UGP sits between the Client and UDP within the mobile device, and between the Agent/Messenger and the UDP within the UPGateway, i.e. link station 124. Operations initiated by the Device 120, referred to as Client Requests, are transactional in nature. Operations initiated by the UPGateway, referred to as Notifications, follow the performer/invoker remote invocation model. These 2 types of communications are fundamentally different. For the sake of clarity, they are described independently in the following sections. The last section describes the layout of the protocol units at an attribute and byte level.

1.1 Client Requests

Client Requests are initiated by the client in response to user input. Typically, the user presses a key on the keypad in response to a system prompt. The keypress is translated into a Client Request which is sent to the UPGateway for processing. Client Requests follow a client/server transactional model. This model has been implemented using a request, reply, acknowledgment client/server interaction.

Figure 4:
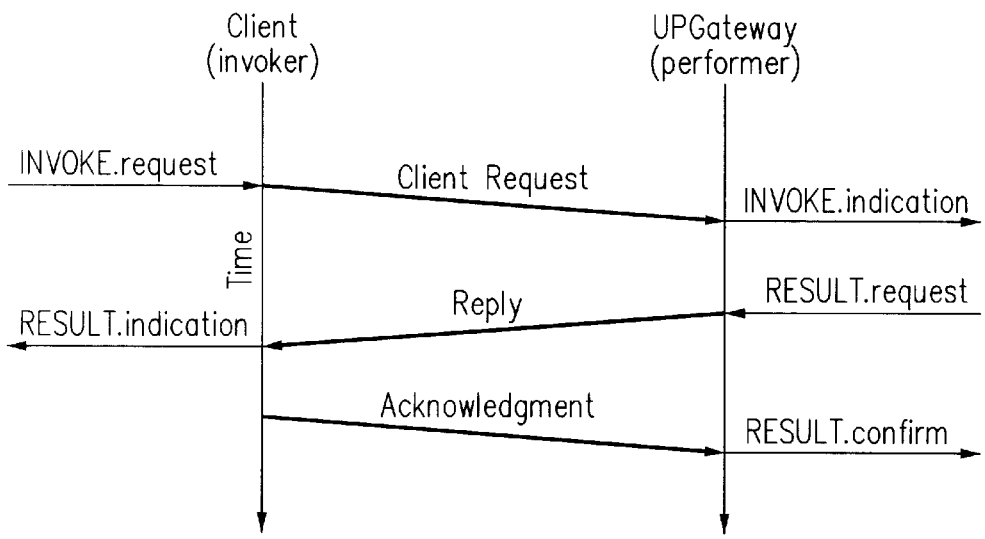
FIG. 4 is a schematic diagram of a simplified client request process.

FIG. 4 depicts the typical transaction. A Client Request is made to the UPGateway. The UPGateway processes the request and returns a reply. The Client responds with an acknowledgment to inform the UPGateway that the reply has been received successfully.

1.1.1 Client Request

A Client Request is issued by the Client in response to user input on the device's key-pad. The Client translates the keypress into a URL that conforms to the HDML standard. The URL is passed to the UGP client layer, as an invoke-request, where it is packed into a Request PDU and sent to the waiting UPGateway.

1.1.2 Reply

The UPGateway constructs, validates, and compresses the reply into TIL which is passed to the UGP server layer where it is packed into a Reply PDU and sent back to the Client. The UGP client layer matches the Reply to a pending Request through use of a transaction identifier. Once the Reply is received, it is posted within the client as a result-indication.

1.1.3 Acknowledgment

The UGP Client layer sends an acknowledgment to all result-requests by the UPGateway. This tells the UPGateway that the Reply has been successfully delivered and the UPgateway can free all state associated with that Request. The acknowledgment contains the number of milliseconds between the time the Request was issued to the time the response was received. This number is the perceived user delay and is logged with each transaction.

Figure 5:
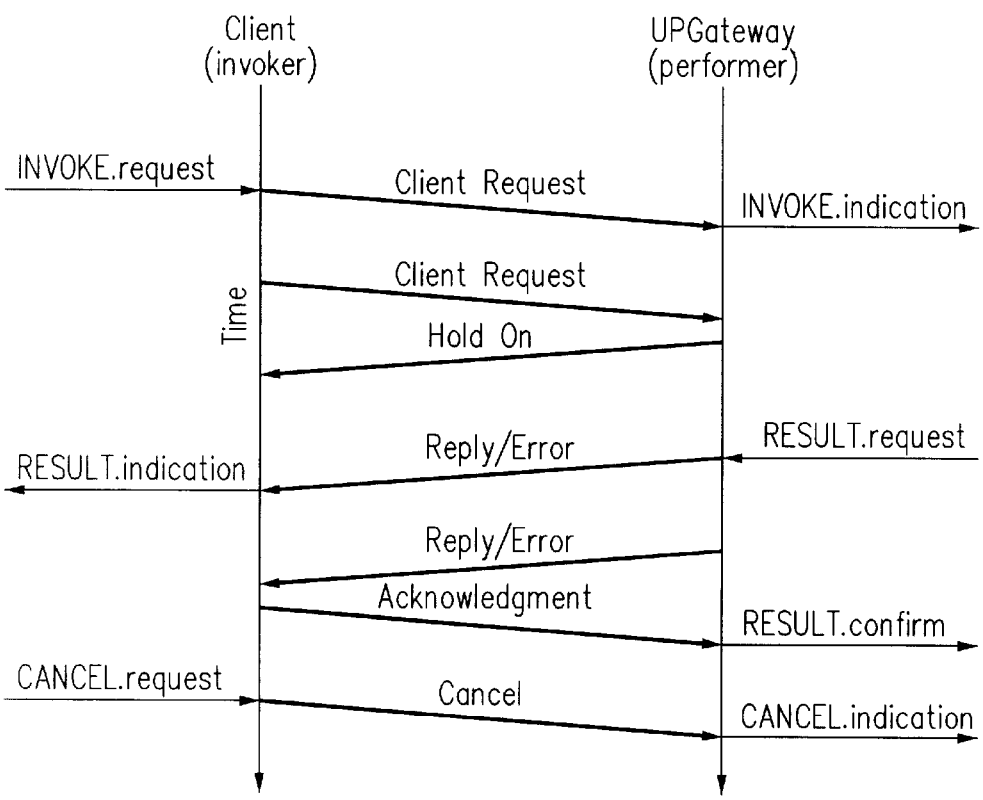
FIG. 5 is a schematic diagram of a typical client request process.

FIG. 4 describes the "perfect world" in which everything happens within the proper amount of time and produces no error conditions. The full picture is a little more complicated as you can see from the FIG. 5.

Unreliable transports, such as UDP, require the application protocol to account for packet sequencing and retransmission. This puts the burden on the UPGateway to resend packets that it thinks might have been lost in transmission. The process is shown in FIG. 6.

Figure 6:
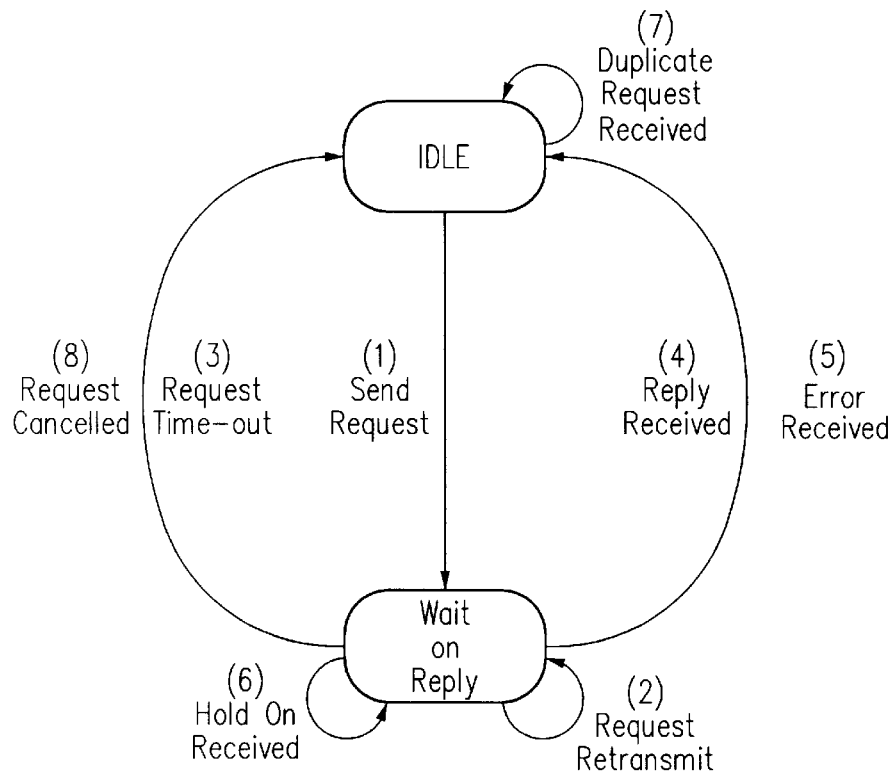
FIG. 6 is a schematic diagram of a process for a client side protocol state machine.

In FIG. 6, for each transition number, the corresponding actions are listed below:

1). Send Request:
   Increment and assign reference number
   Set retransmission timer for CLNT_WAIT_TIME
   Initialize retransmission counter
   Send request PDU.
2). Request Retransmit:
   Retransmit request PDU while number of retransmissions is less than MAX_RETRANSMISSIONS
   Increment the retransmission counter.
3). Request Time-out:
   Send cancel PDU
   Post a time-out error.
4). Reply Received:
   Send reply acknowledgment PDU.
   Remove retransmission timer
   Post reply
5). Error Received:
   Send reply acknowledgment PDU.
   Remove retransmission timer
   Post error.
6). Hold On Received:
   Remove retransmission timer
   Set retransmission timer for CLNT_WAIT_TIME*3
7). Duplicate Reply/Error Received:
   Send reply acknowledgment PDU.
8). Request Canceled:
   Remove retransmission timer
   Send cancel PDU.

1.1.4 Request PDU Retransmit

UGP calls for the retransmission of a Client Request if a response has not been received within a certain amount of time. The actual amount of time is a tunable parameter that should be set somewhere between 5–15 seconds. These retransmissions will continue until either the request is canceled by the user, or a response is received.

The fact that the response is not received within the proper amount does not necessarily mean that the Request packet has been lost. The request could be asking for service from a machine that is slow, or down. In that case, the retransmission of the original request every 10 seconds will cause a great deal of unnecessary communications between the Client and UPGateway. The user is paying for each of these transmissions by the byte and could rack up a great deal of service usage simply in waiting for a request to be processed.

1.1.5 Hold On

A Request acknowledgment scheme has been implemented to prevent this continuous stream of frequent retransmissions. The Request acknowledgment, or Hold On, is sent by the UPGateway to the Client to inform it that the Request has arrived successfully and any further retransmission is unnecessary.

The Client never completely trusts the UPGateway to fulfill its obligations, even after it knows the Request was successfully received. The Hold On packet simply tells the Client that it should wait a little longer before checking on the Request's status. This is done to prevent deadlock in the event that the UPGateway has a catastrophic failure. The Hold On period is also a tunable parameter and should be set somewhere between 4–12 seconds. The UPGateway will continue to send HoldOn packets on an extended schedule as long as the response packet has not been fully constructed. When everything is working perfectly, all client resends will be preempted by HoldOn's from the UPGateway.

1.1.6 Error PDU

A Client Request can fail for any number of reasons. The requesting user may not be registered, the requested service may not be registered or available, the service's response may not be valid. These conditions are reported to the Client through an Error response.

An Error response comes in lieu of a Reply. The Error response is associated with the outstanding Request through use of its sequence number. The Error response is an informational message directed at the user. The Client cannot take appropriate corrective action on the user's behalf, and there is no attempt to do so. The error messages are simply displayed to the user and must be considered part of the user interface.

1.1.7 Request Cancellation

Figure 7:
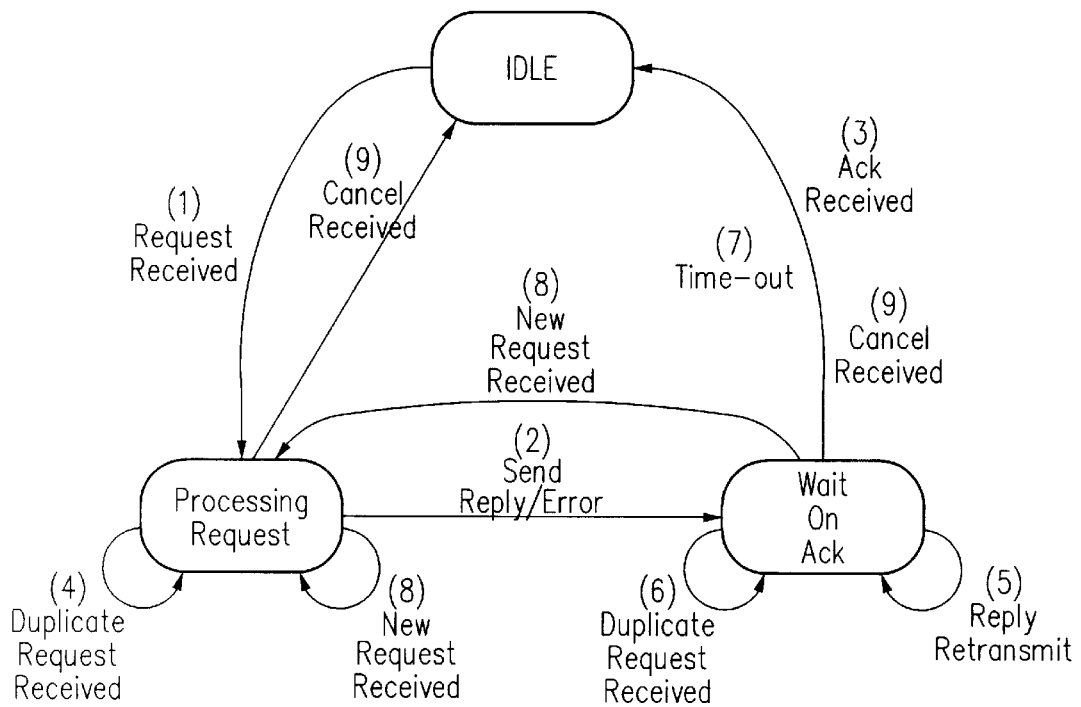
FIG. 7 is a schematic diagram of a process for a server side protocol station machine.

UGP allows the Client to cancel a Request both explicitly and implicitly. UGP includes a Cancel PDU that the Client can send to cancel the current request. Again the UGP transaction identifier is used to pair the Cancel request with the appropriate Client Request. Explicit cancellations do not have a built in acknowledgment mechanism. This is due to the fact that they are issued in response to the user giving up on the current Request and will typically be followed shortly by a new request. The next request acts as an implicit cancellation, as is shown in FIG. 7 and explained in the following description.

Requests are cancelled implicitly by issuing another Request. If the UPGateway receives a new Request from a Client while it is processing the old one, the old one is cancelled and the new one takes its place.

For each transition number in FIG. 7, the corresponding actions are listed below:

1). Request Received:
   Extract REF_NO
   Issue INVOKE-indication.
2). Send Reply/Error:
   Assign REF_NO
   Transmit Reply/Error PDU
   Set retransmission timer for SVC_WAIT_TIME
   Initialize retransmission counter.
3). Acknowledgment Received:
   Remove retransmission timer
   Issue RESULT-confirm
   Release state associated with REF_NO.
4). Duplicate Request Received:
   Send Hold-on PDU.
5). Reply Retransmit:
   Retransmit Reply/Error PDU while number of retransmissions is less than MAX_RETRANSMISSIONS
   Increment the retransmission counter.
6). Duplicate Request Received:
   Transmit Reply/Error PDU.
7). Time-out:
   Issue FAILURE-indication.
8). New Request Received:
   Issue CANCEL-indication
   Release state associated with REF_NO
   Extract REF_NO from new request
   Issue INVOKE-indication.
9). Cancel Received:
   Issue CANCEL-indication
   Release state associated with REF_NO.

1.1.8 Reply Retransmit

Just as the Client retransmits the initial Request in order to ensure it is received, the UPGateway retransmits the response several times in an effort to get it to the waiting Client. Once the Client receives the response it is required to send an Acknowledgment to complete the transaction.

The number of times the UPGateway retransmits, and their frequency, are tunable parameters which default to 3 times and 10 seconds respectively.

1.2 Notifications

Notifications are communication between the client and a Service which are initiated by the Service. They are used to deliver asynchronous events that happen outside of the standard Client Request/Reply scenario. An example of this type of event is the arrival of an email message in the user's mailbox. The message service managing the user's mailbox has the option of forwarding the entire message to the device, forwarding a portion of the message, or just turning the message light on in the device. In order to perform any of these operations, the service must be able to deliver asynchronous notifications to the Client.

Figure 8:
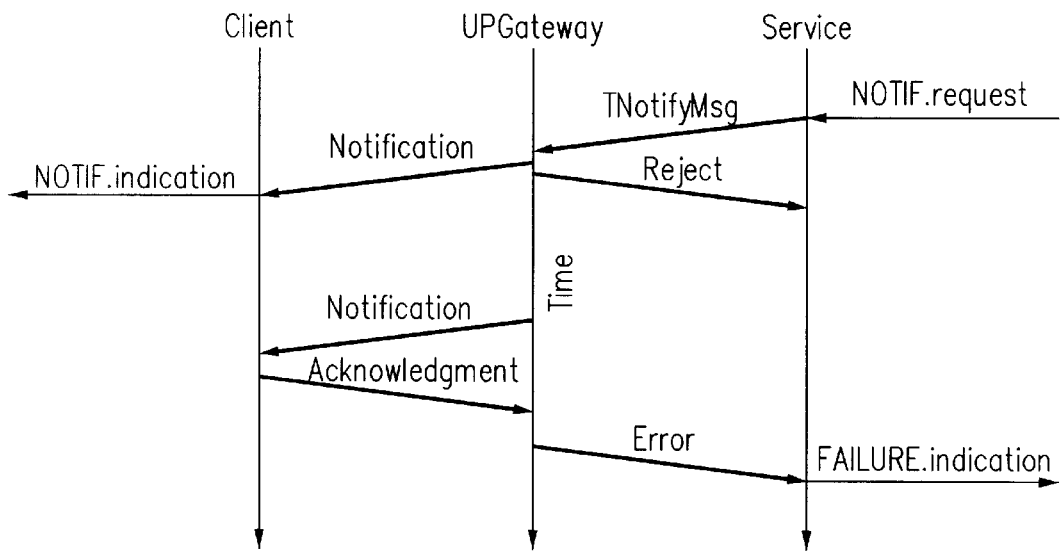
FIG. 8 is a schematic diagram of a process for sending notification to a client.

FIG. 8 depicts the UGP notification time line. The Service begins the sequence by issuing a NOTIFICATION-request, through the RPC interface, to the UPGateway. The UPGateway stores and delivers its content to the Client. The Client responds by returning an Acknowledgment PDU back to the UPGateway. If the Client does not acknowledge the Notification, the UPGateway will continue to retry the delivery procedure for some period of time. The delay between delivery cycles follows an exponentially increasing retry dependent curve. This retry mechanism is necessary to account for the possibility that the device might be turned off or out of range. The Notification interaction does not include a 3-way handshake like the one employed by the Client Request. The UPGateway assumes that each notification stands on its own, and that the Client can deal with duplicate transmissions.

1.2.1 Notification Objects

The Service uses the RPC interface class to deliver a NOTIFICATION-request to the UPGateway. The UPGateway is listening on a well-known address for incoming notifications. Notification objects delivered to this address are scheduled for delivery, and placed in the UPGateway's delivery queue.

1.2.2 Notification

The Notification message is similar in format and function to an RPC request. The Notification PDU contains a procedure number within the Client application where the notification body should be delivered. The Notification body is an opaque block of data of up to 1400 bytes. No assumptions are made by the UPGateway or UGP about the contents of the body so the Client is responsible for performing any necessary validation.

1.2.3 Acknowledgment

The Client UGP layer sends an Acknowledgment PDU in response to each arriving Notification. The Acknowledgment simply means that the Notification was delivered successfully. No other information is implied by an Acknowledgment.

Services and Client applications that wish to implement a request/response paradigm on top of Notifications must use Client Requests to do so.

1.2.4 Error

The UPGateway will continue to retry the delivery of each outstanding notification for some period of time, after which the notification is rejected back to the sender. The period of time is dependent upon the value of MTTL which is supplied be the service when submitting the notification. If the notification is not delivered within the specified MTTL period, the originating service will receive a reject notice from the UPGateway. The notice will include a reject justification as its message body.

PDU Descriptions

UGP is an application protocol that has been built on top of the LSROS standard. The LSROS standard defines 5 base PDU types, the Cancel type is a UGP specific extension:

TABLE A1.1.

| LSROS Categories | |
|---|---|
| Code | PDU Name |
| 0 | Invoke |
| 1 | Result |
| 2 | Error |
| 3 | Acknowledgment |
| 4 | Failure |
| 5 | Cancel |

UGP is organized around these 6 categories of PDUs. UGP defines a number of packet types that fall into the Invoke and Result categories, so it was necessary to supplement the LSROS header with additional UGP header bytes to accommodate the additional types.

The following section describes the byte level format of each of the UGP PDUs. The descriptions are grouped by the LSROS category to which they belong.

1.3.1 Invoke

Figure 9:
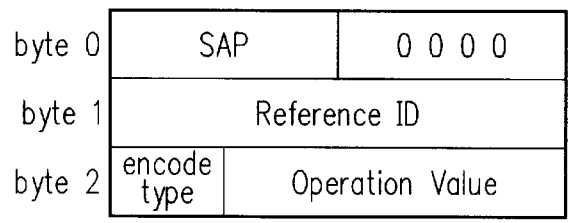
FIG. 9 is a schematic diagram of the structure of a LSROS Invoke PDU.

The LSROS Invoke PDU header consists of 3 bytes that are formatted as shown in FIG. 9.

In FIG. 9, various fields are described as follows:

SAP—4 bit Service Access Point is the LSROS identifier for UP.Link service.

Reference ID—8 bit identifier

Encode Type—Parameter encoding type.

Operation Value—Subtype within the invoke category

TABLE A1.2.

UGP Invoke PDU Operation Values

| Invoke Type | UGP Name |
|---|---|
| 1 | Request |
| 2 | Start-up |
| 3 | Sync |
| 4 | Notify |

TABLE A1.2 lists the UGP PDU operation values that fit within the LSROS Invoke category. The following sections describe each of these UGP PDU types. The shaded areas in the figures represent the LSROS header portion of the PDU.

1.3.1.1 Request

Figure 10:
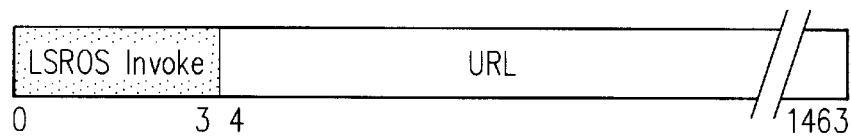
FIG. 10 is a schematic diagram of the structure of a Request PDU.

FIG. 10 shows the structure of a Request PDU, which consists of 2 components:

1). An LSROS Invoke header

2). Up to a 1460 byte URL component.

1.3.1.2 Start-up

Figure 11:
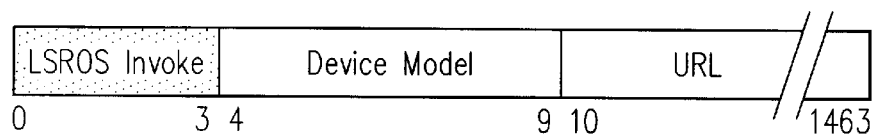
FIG. 11 is a schematic diagram of the structure of a Start-up PDU.

FIG. 11 shows the structure of a Start-up PDU, which consists of 3 components:

1). An LSROS Invoke header

2). A six byte code identifying the device model.

3). Up to a 1454 byte URL component.

1.3.1.3 Sync

Figure 12:
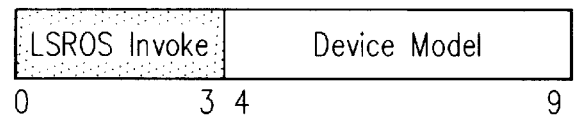
FIG. 12 is a schematic diagram of the structure of a Sync PDU.

FIG. 12 shows the structure of a Sync PDU, which consists of 2 components:

1). An LSROS Invoke header

2). A six byte code identifying the device model 1.3.1.4 Notify

Figure 13:
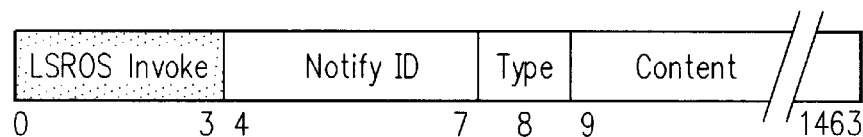
FIG. 13 is a schematic diagram of the structure of a Notify PDU.

FIG. 13 shows the structure of a Notify PDU, which consists of 4 components:

1). An LSROS Invoke header

2). A four byte sequence number that can be used to uniquely identify the notification.

3). A one byte notification type that is defined by the service

4) Up to 1454 bytes worth of notification content.

1.3.2 Result

Figure 14:
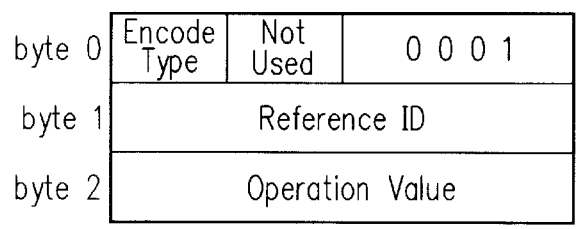
FIG. 14 is a schematic diagram of the structure of a LSROS Result PDU.

The LSROS Result PDU header consists of 3 bytes that are formatted as follows:

FIG. 14 shows the structure of a LSROS Result PDU, of which the fields are described as:

Encode Type—Parameter encoding type.

Reference ID—8 bit identifier

Operation Value—Subtype within the Result category

TABLE A1.3

UGP Result PDU Operation Values

| Invoke Type | UGP Name |
|---|---|
| 5 | RequestReply |
| 6 | StartupReply |
| 7 | SyncReply |
| 8 | NotifyReply |
| 9 | Redirect |

TABLE A1.2 lists the UGP PDU types that fit within the LSROS Result category. The following sections describe each of these UGP PDU types. The shaded areas in the figures represent the LSROS header portion of the PDU.

1.3.2.1 RequestReply

Figure 15:
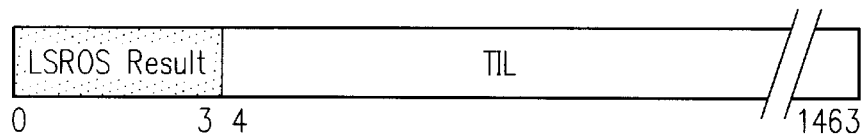
FIG. 15 is a schematic diagram of the structure of a RequestReply PDU.

FIG. 15 shows the structure of a RequestReply PDU, which consists of 2 components:

1). An LSROS Result header

2). Up to a 1460 byte TTL component. TIL is a compiled and compressed version of HDML.

1.3.2.2 StartupReply

Figure 16:
FIG. 16 is a schematic diagram of the structure of a StartupReply PDU.

FIG. 16 shows the structure of a StartupReply PDU, which consists of 3 components:

1). An LSROS Result header

2). A four byte timestamp containing the value of time in seconds since 00:00:00 UTC, Jan. 1, 1970.

3). Up to a 1456 byte TIL component. TIL is a compiled and compressed version of HDML.

1.3.2.3 SyncReply

Figure 17:
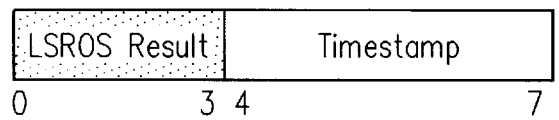
FIG. 17 is a schematic diagram of the structure of a SyncReply PDU.

FIG. 17 shows the structure of a SyncReply PDU, which consists of 2 components:

1). An LSROS Result header

2). A four byte timestamp containing the value of time in seconds since 00:00:00 UTC, Jan. 1, 1970.

1.3.2.4 NotifyReply

Figure 18:
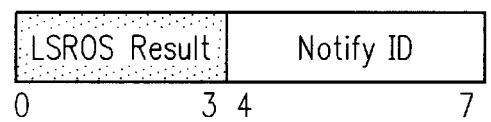
FIG. 18 is a schematic diagram of the structure of a NotifyReply PDU.

FIG. 18 shows the structure of a NotifyReply PDU, which consists of 2 components:

1). An LSROS Result header

2). A four byte sequence number that can be used to uniquely identify the notification.

1.3.2.5 Redirect

Figure 19:
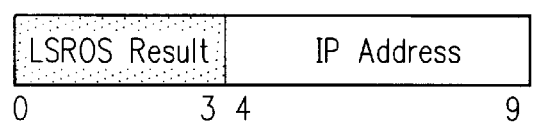
FIG. 19 is a schematic diagram of the structure of Redirect PDU.

FIG. 19 shows the structure of a Redirect PDU, which consists of 2 components:

1). An LSROS Result header

2). A six byte address that contains a 4 byte internet address and 2 bytes of port number, all in network byte order.

1.3 Error

Figure 20:
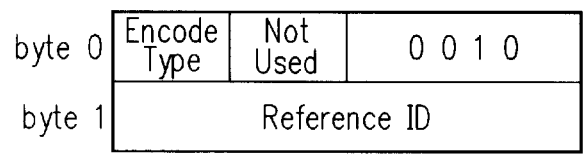
FIG. 20 is a schematic diagram of the structure of LSROS Error DU.

The LSROS Error PDU header consists of 2 bytes that are formatted as shown in FIG. 20.

The LSROS error header is followed by a string of up to 1464 bytes in length.

1.3.4 Acknowledgment

Figure 21:
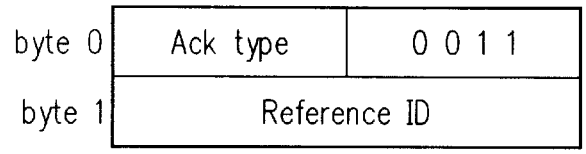
FIG. 21 is a schematic diagram of the structure of LSROS Acknowledgment PDU.

The LSROS Acknowledgment PDU header consists of 2 bytes that are formatted as shown in FIG. 21. The LSROS Acknowledgment PDU has the following components:

1) Ack Type—Either a reply acknowledgment or Holdon.

2) Reference ID—8 bit identifier

TABLE A1.4

LSROS Ack Types

| Ack Type | UGP Name |
|---|---|
| 0 | Ack |
| 1 | Holdon |

TABLE A1.4 lists the LSROS Ack types that fit within the LSROS Ack category. The following sections describe each of these PDU types. The shaded areas in the figures represent the LSROS header portion of the PDU.

1.3.4.1 Reply Acknowledgment

FIG. 22 shows the structure of a Reply Acknowledgment PDU, which consists of 3 components:

1). An LSROS Ack header

2). A four byte field containing the number of milliseconds since the request was issued by the client device.

3). A one byte field containing the number of retries the client performed before the result arrived.

1.3.4.2 Holdon

FIG. 23 shows the structure of a Holdon, which is fully contained within the LSROS header.

1.3.5 Failure

The LSROS Failure PDU header consists of 3 bytes that are formatted as shown in FIG. 24. The failure values are listed in the following TABLE A1.5.

TABLE A1.5

LSROS Failure Values

| Value | Meaning |
|---|---|
| 0 | Transmission failure |
| 1 | Out of local resources |
| 2 | User not responding |
| 3 | Out of remote resources |

1.3.6 Cancel

The Cancel PDU header consists of 2 bytes that are formatted as shown in FIG. 25.

APPENDIX A2

SUGP Protocol Specification

This appendix is a specification for SUGP protocol.

2.1.0 Project Summary

SUGP (Secure UP.Link Gateway Protocol) is an application protocol for remote operations between an UP.Browser and an UP.Link. It provides a mechanism for requests, replies, message privacy, message integrity, session, authentication, notifications, and automatic configuring.

Figure 26:
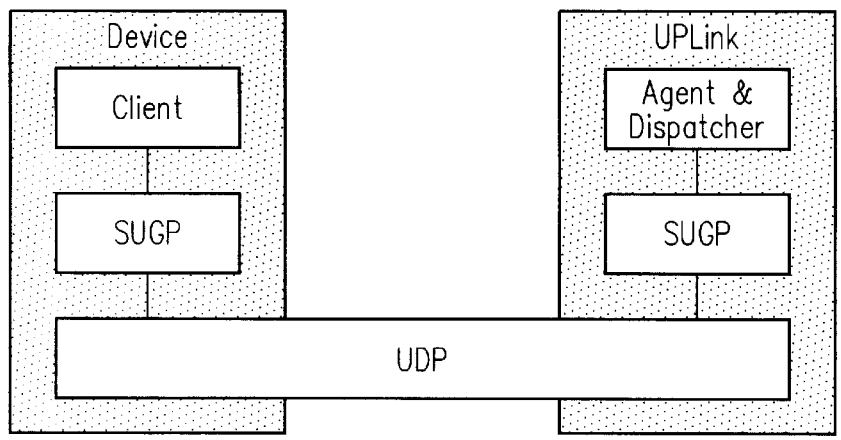
FIG. 26 is a schematic diagram of a data network using SUGP protocol.

SUGP is the next generation of UGP, or ANTP. FIG. 26 is a schematic diagram of a data network using SUGP Protocol.

2.2.0 Features, Goals and Requirements 2.2.1 Goals and Requirements

Interactive requests/replies between an UP.Browser and an UP.Link

Secure communication between an UP.Browser and an UP.Link

Support for authentication

Support for automatic configuring of an UP.Browser

Support for notifications 2.2.2 Assumptions

UDP is assumed as the primary communication transport mechanism between an UP.Browser and an UP.Link.

Encryption and key exchange algorithms do not impose extremely difficulties in performance and memory size requirements for the device.

2.2.3 Features

A set of Protocol Data Unit (PDU) definitions Compared to UGP, SUGP has additional PDU's to handle secure communication, session creation, support for automatic provisioning/configuring, and support for service credential. The following is a list of all PDU's.

Session Request
Session Reply
Session Complete
Service Request
Service Reply
Extended Service Request Extended Service Reply Key Request
Key Reply
Signal
Get Notify
Notify Reply
Post
Redirect
Error
Cancel
Ack
Hold On The protocol is no longer built on top of LSROS. The protocol PDU encoding will be optimized for UP.Link architecture.

An API for the protocol

Because the protocol PDU has been redefined, the corresponding API is also redefined. However, SUGP API preserves the basic features in UGP API such as objected oriented API functions and buffer manipulation API. Like UGP API, SUGP API is a direct API on top of the protocol PDU. All function names are different from UGP API.

SUGP API has a set of setter's and getter's common for all PDU types and for each individual PDU types. There are also API's for encryption and decryption.

Message Privacy between an UP.Browser and an UP.Link

All PDU's are encrypted except that certain fields of session creation PDU's must be sent in clear text.

Message Integrity between an UP.Browser and an UP.Link

Message integrity are enforced by using check-sum for the entire PDU. The checksum is then encrypted together with the PDU.

Counteracting Playback Attacks

Playback is a very common security attack. The protocol provides the means to counteract playback attacks. The proposed approach is to use request Id to detect playback requests for normal requests. The request Id is encrypted in the protocol PDU, Every request and reply must carry a request id. During the life time of a session, any request id in requests/replies must equal to the current request id in both server and client.

For the session creation process, both client and server challenge each other by using a nonce as a challenge and nonce+1 as a response to the challenge to avoid playback of session creation requests.

Session based request/reply model

All the requests and replies must be associated with a session context (either a server session context or a client session context). The requests normally carry a 4 byte server session id. A session creation request is associated with a special session with sid=0. The client is typically considered to have 2 sessions: session with encryption and session without encryption.

Session creation and authentication

All the sessions are authenticated. The session authentication between an UP.Browser and an UP.Link is conducted by using shared secret key between them and a nonce challenge.

As part of the session creation process, version, cipher choice, and device type for the session are associated with the session context.

Automatic configuring support

The protocol supports distribution of permanent shared secret key from an UP.Link to an UP.Browser, when the device is first activated. Diffie-Hellman key exchange protocol is used in the process to securely distribute the shared secret key to the device after appropriate authentication. This is an one time process.

Request Piggybacking
   The session creation process requires the client to send at least two messages (Session Request and Session Complete) to the server to complete the session creation. The second message (Session Complete) can piggyback a normal request.

Versioning
   Although backward compatibility for the current product is not required, the protocol provides version control mechanism, so that the protocol can be implemented to be backward compatible or forward compatible in the future. The proposed approach is to add a version number in the session creation PDU's. Version is thus associated with a session context.

Different block cipher algorithms support
   The protocol provides means to support different cipher algorithms. As part of session creation request, the browser indicates its cipher choice.
   UP.Link must support multiple block cipher algorithms for different sessions. However, Version 2.0 will not implement multiple block cipher algorithms. Only RCS is implemented. This is a long term feature.

Service credential support
   The protocol allows UP.Browser to authenticate itself to a service by UID/password. The proposed method is to let UP.Link return an error deck to UP.Browser Compression
   Compression is considered in the design but is not planned for Version 2.0 implementation.

2.3.0 Application Programming InterfaceSUGP is the next generation of UGP. Although there are many new capabilities, API for SUGP is conceptually similar to API for UGP. The following describes similarities and differences between SUGP API and UGP API. For those who wish to see the complete API definitions, please refer to sugp.h.

2.3.1 Similarities Between SUGP API and UGP(ANTP) API
   SUGP API is also a direct interface on the protocol PDU's. There are setter's and getter's functions to construct/consume the protocol PDU's. For instance, SugpGet-SessionId0, SugpGetDigest0, and SugpSetRequestId0. The complete definitions for all the setter's and getter's are provided in sugp.h.
   SUGP API expects the upper layer application to allocate/free memory buffers for constructing and receiving protocol PDU's.

2.3.2 Differences Between SUGP API and UGP (ANTP) API
   SUGP API has a complete new set of protocol PDU types and function names.
   Both UP.Browser and UP.Link must maintain session contexts. A session context may typically contain IP address/subscriberID/deviceID, session keys, version info, cipher choice, and device type. Once a session is established, subsequent protocol PDU's do not carry the session wide information any more because they are in the session context.
   Server has a notion of session id to identify a session context. The server session id is defined as an unsigned integer of 4 bytes. The session id's are never encrypted and are used to get session context from the session table. Values 0–15 in the server session id space are reserved for special "sessions" such as session creation. The browser only has one session context so that there is no need for session id.
   Encryption/Decryption functions are introduced to encrypt/decrypt the protocol PDU's. Both encryption and decryption functions require keys. Those functions also generate/verify checksum's for message integrity and may perform compression.
   Both UP.Browser and UP.Link should have no problem to provide session keys for sending a PDU. For receiving a PDU, the upper layers do the following to look up a session key.
   Client: Receive first, get the unique session key.
   UP.Link: Receive first, use SessionId to look up the session key.

2.4.0 Protocol PDU DefinitionsThis chapter describes the SUGP PDU (Protocol Data Unit), which is the data format to be exchanged between an UP.Browser and an UP.Link. The Name column in several of the PDU definition tables often have encryption applied.

Figure 27:
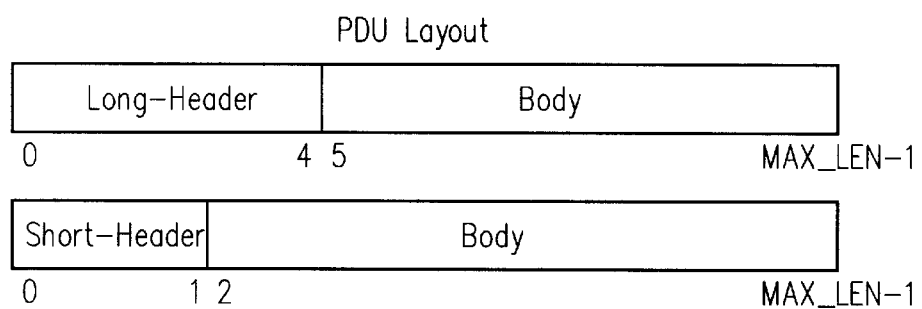
FIG. 27 is a schematic diagram of the structure of a long header and a short header.

2.4.1 IntroductionEvery PDU has a Header and a Body. A header is followed by the Body which contains the PDU type specific content. There are two kinds of headers: Long-Header and Short-Header. Long-Header has 5 bytes and is destined to servers. Short-Header has 2 bytes and is destined to clients. MAX-LEN is the maximum length of the entire PDU, which typically is the MTU of UDP minus the overhead for encryption. The length of a Body can be up to MAX LEN - Header. The structure of a long header and a short header is shown in FIG. 27.

2.4.2 PDU Long-HeaderThe Long-Header is for PDU's destined for an UP.Link. It has a server semantics because only servers will receive those PDU's and process them accordingly. The Long Header format is shown in Table A2.1.

TABLE A2.1

Long-Header Format

| Name | Length | Purpose |
| --- | --- | --- |
| SessionId | 4 bytes | Identifies session in the server session context table |
| requestId | 1 byte | identifying a request. Used for counteracting playback attack |

Comments:
   SessionId value 0x00000000–0x0000000F are reserved for special purposes. Currently, 0x00000000 is used to indicates that PDU is not encrypted at least for the following:
   Long-Header;
   Type in the Body;
This is currently only used for session creation. 0x00000001–0x0000000F are reserved for future use.
   requestId is also used to identify duplicated requests due to client retransmission.

2.4.3 PDU Short-HeaderThe Short-Header is for PDU's destined for clients. It has a client semantics because only client will receive those PDU's and process them as either replies, errors, or notifications. The Short Header format is shown in Table A2.2.

TABLE A2.2

Short-Header Format

| Name | Length | Purpose |
| --- | --- | --- |
| session | 1 byte | indicates session context |
| requestId | 1 byte | identifying a request. Used for counteracting playback attack |

Comments:
   session values are allocated as:
      0—no encryption (for some special PDU's and error PDU with certain error codes);
      1—encryption with Shared Secret Key (for session reply and error PDU with certain error codes);

2—encryption with session key (for reply / error PDU within a normal session);
others—reserved for future use;
requestId is also used to identify duplicated replies due to server retransmission.

2.4.4 PDU Body

Figure 28:
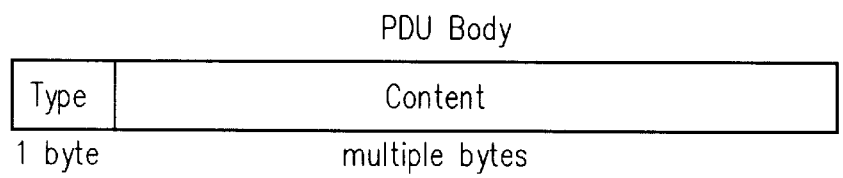
FIG. 28 is a schematic diagram of a PDU body used in an SUG protocol.

Type specific contents are defined as Bodies. Every Body's first byte is the type or a tag of a Body, which identifies the type of operations the PDU is entitled to. Everything begins at the second byte are type specific content, which are referred to as Content from now on. The structure of a PDU Body used in SUGP is shown in FIG. 28.

Comments:

The highest bit in Type is used (when it is set to 1) for:
an Ack for n−1 request's reply where n is the current request's id for Long PDU's; this makes possible for the client to piggybacking Ack's;
indicating if compression is on for Short PDU's;

2.4.4.1 Status

Status is a bit mask of one byte. It is a modifier for selected reply PDU's so that certain conditions are indicated to the client. Table A2.3 lists status values.

TABLE A2.3

Status

| Name | Bit | Purpose |
|---|---|---|
| SYNC | 0 | if 1, indicates to get time and check if notification is pending |
| NTFY | 1 | if 1, indicates notification pending |
| ACCEPT | 2 | if 1, indicates that client accepts server proposed cipher |
| reserved | 3 – 7 | reserved for future use |

4.4.2 Session Request

The data structure of a Session Request is listed in TABLE A2.4. Purpose: Create a session.
Header Type: Long
Source: client
Destination: UP.Link

TABLE A2.4

Session Request

| Name | Length | Value/Purpose |
|---|---|---|
| type | 1 byte | 1 |
| cipher | 2 byte | cipher: algorithms and parameters, NBO |
| version | 1 byte | SUGP protocol version |
| locale | 1 byte | localization support |
| deviceType | 6 bytes | device type: hardware/software type/version for device |
| deviceId_len | 1 byte | length of device id |
| deviceId | variable | device identifier up to 255 bytes long |
| cnonce | 2 bytes | client nonce challenge to server for authentication, NBO | a. NBO stands for Network Byte Order

Comments:

This PDU is not encrypted up to device Id field. The session Id in the Long Header is 0 to indicate that this PDU is partially encrypted.

version is encoded as MAJOR:MINOR (4:4). The policies for backward/forward compatibility can be determined in the future.

UP.Link accepts "NoEncryption" only if UP.Link is configured so. This normally assumes that the operating environment is secure.

cipher encoding: 1st byte is the code for combination of algorithm and configuration. For instance, value 0×01 is for RC5 with word size 32 bits, key size 16 bytes, and variable rounds. 2nd byte is the additional parameter as needed for the 1st byte. If 1st byte's value is 0×01, 2nd byte is the number of rounds for RC5. The meaning of 2nd byte depends on the code for the 1st byte.

2.4.4.3 Session Reply

The data structure of a Session Reply is listed in TABLE A2.5. Purpose: Server response to a Session Request.
Header Type: Short
Source: UP.Link
Destination: client

TABLE A2.5

Session Reply

| Name | Length | Value/Purpose |
|---|---|---|
| type | 1 byte | 10 |
| limit | 1 byte | security violation count limit (e.g., decryption failures) |
| sessionId | 4 bytes | session Id identifying session context in UP.Link, NBO |
| cipher | 2 bytes | cipher confirmation, NBO |
| cnonceplus | 2 bytes | sty rspns to nonce challenge to satisfy authentication, NBO |
| snounce | 2 bytes | server nonce challenge to the client for authentication, NBO |
| bootinfo_len | 2 byte | bootinfo length, NBO |
| key_len | 1 byte | key length |
| displist_count | 1 byte | number of dispatcher IP addresses in displist |
| key | variable | session key |
| bootinfo | variable | bootstrap info (e.g., home page URL, etc.) |
| displist | variable | array of IP addresses (6 bytes each) for dispatchers |

Comments:

The long sessionId in the above table is the server session id which identifies the session context for the session just created in the server. The client saves this sessionId in its corresponding session context. From this point on, any requests to the server will use the 4 byte server sessionId in the Long -Header.

displist is a list of dispatchers. The purpose is for higher availability and load balancing. The browser is initially provisioned with a single IP address for a dispatcher. That dispatcher may return a list of other dispatchers for client's future use after the first session is established. The browser sequentially picks the next IP address from the list for the next new session.

2.4.4.4 Session Complete

The data structure of a Session Complete is listed in TABLE A2.6.
Purpose: Complete the session creation process.
Optionally, a request PDU may be piggybacked.
Header Type: Long
Source: client
Destination: UP.Link

TABLE A2.6.

Session Complete

| Name | Length | Value/Purpose |
|---|---|---|
| type | 1 byte | 8 |
| snonceplus | 2 bytes | clnt response to srv nonce |

TABLE A2.6.-continued

Session Complete

| Name | Length | Value/Purpose |
|---|---|---|
|  |  | challenge to satisfy authentication, NBO |
| length | 2 byte | length for the following variable length field; net byte order, NBO |
| status | 1 byte | ACCEPT indicates that client accepts server proposed cipher. |
| request | variable | a piggybacked request PDU |

2.4.4.5 Service Request

The data structure of a Service Request is listed in TABLE A2.7.
Purpose: Service URL request to UP.Link.
Header Type: Long
Source: client
Destination: UP.Link

TABLE A2.7

Service Request

| Name | Length | Value/Purpose |
|---|---|---|
| type | 1 byte | 2 |
| length | 2 bytes | the length of the following variable field, NBO |
| serviceURL | variable | service URL |

2.4.4.6 Service Reply

The data structure of a Service Reply is listed in TABLE A2.8.
Purpose: Return the digest from an UP.LINK to client.
Header Type: Short
Source: UP.Link
Destination: client

TABLE A2.8

Service Reply

| Name | Length | Value/Purpose |
|---|---|---|
| type | 1 byte | 8 |
| length | 2 byte | the length of the following variable field; NBO |
| digest | variable | digest as a result of a URL Service Request |

2.4.4.7 Extended Service Request

The data structure of an Extended Service Request is listed in TABLE A2.9.
Purpose: Service URL request to UP.Link with additional information.
Header Type: Long
Source: client
Destination: UP.Link

TABLE A2.9

Extended Service Request

| Name | Length | Value/Purpose |
|---|---|---|
| type | 1 byte | 3 |
| url_len | 2 bytes | length of URL, NBO |
| header_len | 2 bytes | length of header, NBO |

TABLE A2.9-continued

Extended Service Request

| Name | Length | Value/Purpose |
|---|---|---|
| status | 1 byte | SYNC indicates get time and get notify status |
| URL | variable | service URL |
| header | variable | header such as origin URL |

2.4.4.8 Extended Service Reply

The data structure of an Extended Service Reply is listed in TABLE A2.10.
Purpose: Return the digest and additional information from an UP.Link to client
Header Type: Short
Source: UP.Link
Destination: client

TABLE A2.10

Extended Service Reply

| Name | Length | Value/Purpose |
|---|---|---|
| type | 1 byte | 3 |
| status | 1 byte | NTFY indicates that notification pending |
| time | 4 bytes | time of the day, NBO |
| length | 2 bytes | the length of the following variable field, NBO |
| digest | 2 byte | the length of the following variable field, NBO |

2.4.4.9 Key Request

The data structure of a Key Request is listed in TABLE A2.11.
Purpose: Request for establishing a new shared secret key between UP.Browser and UP.Link.
Header Type: Long
Source: client
Destination: UP.Link

TABLE A2.11

Key Request

| Name | Length | Value/Purpose |
|---|---|---|
| type | 1 byte | 9 |
| param_id | 1 byte | DH parameter set identifier |
| deviceId_len | 1 byte | deviceId length |
| keyData_len | 1 byte | keyData length |
| deviceId | variable | public key of the client |
| keyData | variable | public key of the client |

Comments:

not encrypted;

sid==0;

2.4.4.10 Key Reply

The data structure of a Key Reply is listed in TABLE A2.12.
Purpose: UP.Link returns its public key to complete the process for establishing a new shared secret key between UP.Browser and UP.Link.
Header Type: Short
Source: UP.Link Destination: client

TABLE A2.12

Key Reply

| Name | Length | Value/Purpose |
|---|---|---|
| type | 1 byte | 17 |
| keyData_len | 1 byte | keyData length |
| keyData | variable | public key of the server |

Comments:

Not encrypted;

sid==0;

2.4.4.11 Signal

The data structure of a Signal is listed in TABLE A2.13.

Purpose: UP.Link (e.g., UP.Link Messenger) signals a device for notifications.

Header Type: Short
Source: UP.Link
Destination: client

TABLE A2.13

Signal

| Name | Length | Value/Purpose |
|---|---|---|
| type | 1 byte | 16 |

Comments:

Signal is not encrypted.

sid is set to 0 in the header.

2.4.4.12 Get Notify

The data structure of a Get Notify is listed in TABLE A2.14.

Purpose: client gets next notification after receiving a Signal PDU.

Header Type: Long
Source: client
Destination: UP.Link

TABLE A2.14

Get Notify

| Name | Length | Value/Purpose |
|---|---|---|
| type | 1 byte | 5 |

2.4.4.13 Notify Reply

The data structure of a Notify Reply is listed in TABLE A2.15.

Purpose: reply for Get Notify.
Header Type: Short
Source: UP.Link
Destination: client

TABLE A2.15

Notify Reply

| Name | Length | Value/Purpose |
|---|---|---|
| type | 1 byte | 13 |
| status | 1 byte | NTFY indicates more notification pending |
| ntfy_id | 4 byte2 | unique notification id, NBO |
| url_len | 2 bytes | url length, NBO |

TABLE A2.15-continued

Notify Reply

| Name | Length | Value/Purpose |
|---|---|---|
| content_len | 2 bytes | content length, NBO |
| url | variable | base URL length |
| content | variable | content digest |

Comments:

status==NTFY indicates more notifications pending, which makes chained fetching of notifications possible.

base Url is used for security.

2.2.4.14 Post

The data structure of a Post is listed in TABLE A2.16.

Purpose: client post data to UP.Link to perform HTTP Post.

Header Type: Long
Source: client
Destination: UP.Link

TABLE A2.16

Post

| Name | Length | Value/Purpose |
|---|---|---|
| type | 1 byte | 4 |
| url_len | 2 bytes | URL length, NBO |
| data_len | 2 bytes | Data length, NBO |
| header_len | 2 bytes | header length, NBO |
| URL | 2 bytes | URL |
| Data | variable | data to be posted |
| header | variable | header |

2.4.4.15 Redirect

The data structure of a Redirect is listed in TABLE A2.17.

Purpose: Redirect a client to another UP.Link.

Header Type: Short
Source: UP.Link
Destination: client

TABLE A2.17

Redirect

| Name | Length | Value/Purpose |
|---|---|---|
| type | 1 byte | 18 |
| address | 6 bytes | 4 byte IP address followed by 2 byte port number, all NBO |

Comments:

Redirect PDU is not encrypted. The redirected UP.Link will be authenticated by the client during the session creation process by the Shared Secret Key.

Only Session Request can be redirected;

sid==0;

2.4.4.16 Error

The data structure of an Error is listed in TABLE A2.18.

Purpose: Return errors to a client from an UP.Link.

Header Type: Short
Source: UP.Link
Destination: client

TABLE A2.18

Error

| Name | Length | Value/Purpose |
|---|---|---|
| type | 1 byte | 14 |
| code | 2 bytes | error code, NBO |
| length | 2 bytes | length of the following variable field, NBO |
| errorDigest | variable | HDMLC digest carrying error messages/actions |

2.4.4.17 Cancel
The data structure of a Cancel is listed in TABLE A2.19.
Purpose: Cancel a request
Header Type: Long
Source: client
Destination: UP.Link

TABLE A2.19

Cancel

| Name | Length | Value/Purpose |
|---|---|---|
| type | 1 byte | 6 |

2.4.4.18 Ack
The data structure of an Ack is listed in TABLE A2.20.
Purpose: Acknowledge receipt of the replies from UP.Link.
Header Type: Long
Source: client
Destination: UP.Link

TABLE A2.20

Ack

| Name | Length | Value/Purpose |
|---|---|---|
| type | 1 byte | 7 |
| delay | 2 bytes | round trip time for a request |
| tries | 1 byte | number of times the client retransmitted the request |

Comments:
Ack can be sent alone when acknowledge is required, but the highest bit in the Type field for the request PDU's should be used instead to acknowledge n−1 request's reply whenever possible, where n is the current request id;

2.4.4.19 Hold On
The data structure of a Hold On is listed in TABLE A2.21.
Purpose: An UP.Link deters a client for retransmission of a request while the request is in process, longer than normal process time.
Header Type: Short
Source: UP.Link
Destination: client

TABLE A2.21

Hold On

| Name | Length | Value/Purpose |
|---|---|---|
| type | 1 byte | 15 |

2.5.0 Protocol Operations
This section describes how to use the SUGP protocol PDU's to perform higher level tasks such as session creation and client requests.

2.5.1 Session
Every request and every reply are associated with a session context. The session context may typically contain the following information:
Session Id
Session Key
Cipher
Protocol Version
Request Id
device Id
device type Server session Id is an unsigned long of 4 bytes. Both client session and server session serve the same purpose: associate information for a particular communication instance between a client and a server. Because the client only has one session, the session id is not required, but the notion of a session exists.

SUGP reserves 0–15 for server session id's for special purposes (e.g., session creation). Although only 0's are used in server currently, the others may be used for other special purposes in the future.

Server is expected to serve many devices so that its session table of session contexts is large. The implementation for server session contexts is expected to be RDBMS tables with an index on Session Id.

Figure 29:
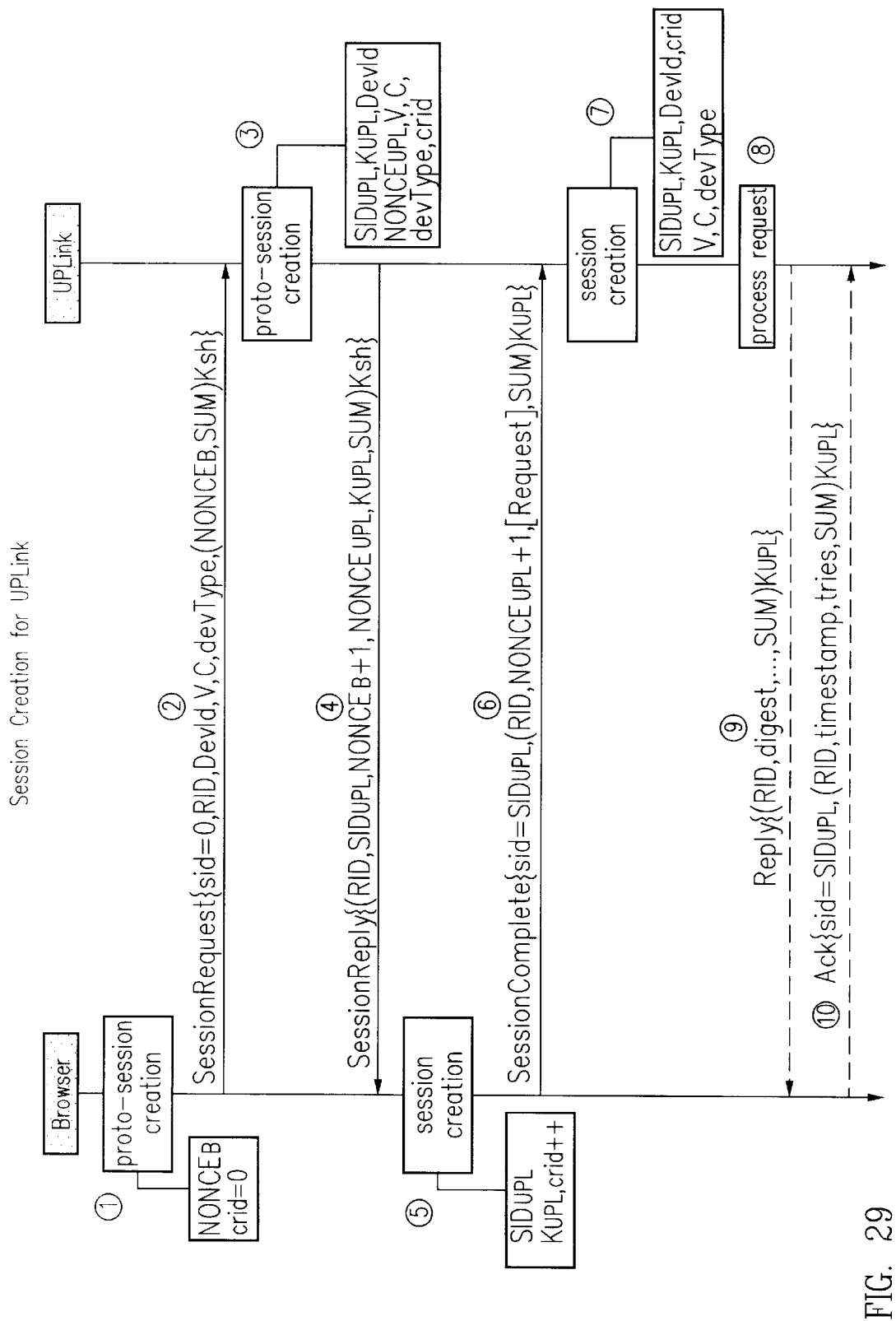
FIG. 29 is a schematic diagram of the sequence of events between a browser and an UP.Link during the session creation process.

2.5.2 Session Creation
An UP.Link session creation process is initiated by a browser which wishes to establish a secure communication channel with an UP.Link. FIG. 29 shows the sequence of events during the session creation process between a browser and an UP.Link.

In FIG. 29, (X)K denotes that data X is encrypted by key K using a given cipher algorithm C. {Y,Z} denotes that X and Z are elements in the request or reply PDU's. The meaning of the abbreviations is explained below.
sid: session id
RID: Request ID
V: Version of the SUGP protocol
C: Cipher Choice (e.g., no Encryption, RC5, RC2)
devType: device type information
crid: current request id
$SID_{UPL}$: session id for UP.Link. It is 4 byte long.
$NONCE_B$: nonce generated in browser.
$NONCE_B$: nonce generated in UP.Link.
SUM: check sum for the entire request or reply for message integrity.
DevId: device id
$K_{sh}$: the shared secret key between the browser and UP.Link
$K_{UPL}$: the session key issued by UP.Link.

1. The browser initiates a session creation request by first creating a client proto-session with $NONCE_B$, and resetting the current request id (crid) to 0.
2. The browser sends a Session Request to UP.Link. The sid is set to 0 to indicate that this is a Session Request. The browser sends all the information necessary to establish a session with UP.Link, including cipher choice, device type, and version information. To authenticate the server, the browser also sends $NONCE_B$ to challenge the server in the request.

3. Upon receiving the Session Request, UP.Link reads the plaintext portion of the requests. The plaintext fields are shown in the diagram. Using DevId as an index, UP.Link looks up $K_{sh}$. Once $K_{sh}$ is found, a proto-session is created. UP.Link generates a session id, a key for the session, and NONCE$_{UPL}$ to challenge the browser for authentication. UP.Link also saves all information in the request for the session.

4. UP.Link sends reply to the browser with session key, session id, bootinfo, and the challenge (NONCE$_{UPL}$).

5. At this point, the browser checks the challenge for UP.Link and authenticate that UP.Link is really UP.Link which holds its shared key $K_{sh}$. The browser then creates the session and saves the server session id and the session key for the future requests. The browser also increments the current request id (crid).

6. The browser must respond to UP.Link's challenge to authenticate itself that the browser is the browser which holds the shared secret key $K_{sh}$. The browser may optionally piggyback a request to UP.Link for process.

7. UP.Link authenticates the browser at this point. If the browser is authenticated, the session is created; otherwise, the corresponding proto-session is discarded. If there is an pre-existing session with the browser, that session is automatically terminated.

8. If a piggybacked request is attached, UP.Link process the request.

9. UP.Link sends reply to the browser.

10. The browser sends an ack to UP.Link. After this point, normal requests follow.

2.5.3 Device Power On[1]

See also Notifications sub-section for the default action when a device powers on.

Figure 30:
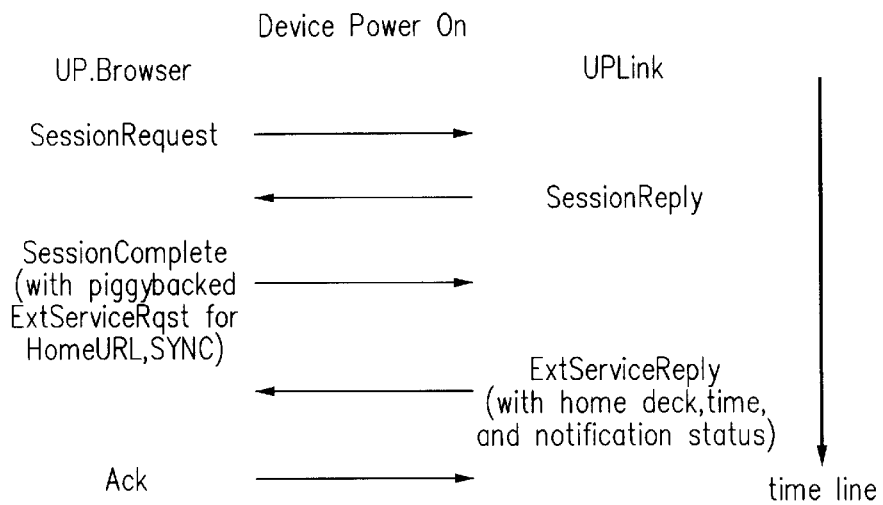

The device is expected to cache sessions. If the device does not cache sessions, the session will be created before any requests can be served. At the power on, the device normally has the following three tasks to perform in one single request:

get time, if the device does not have a persistent clock;
get notification status;
get home URL, if necessary;

FIG. 30 shows typical SUGP protocol interactions at power on.

2.5.4 Client Requests

Figure 31:
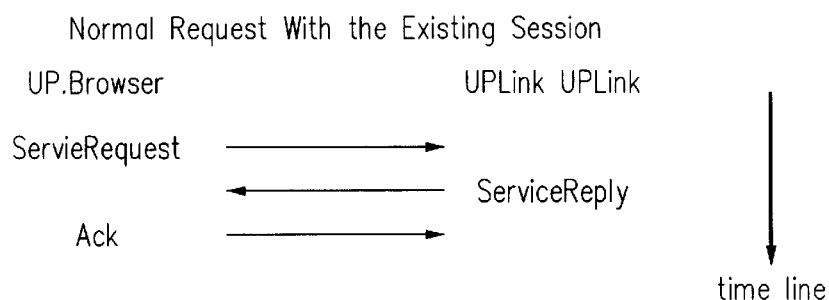
FIG. 31 is a schematic diagram of a normal request process with an existing session.

The simplest client request form is sending request to UP.Link with an existing session. Because the session between the UP.Browser and UP.Link already exists, a service request can be sent directly to UP.Link. FIG. 31 shows a normal request process with an existing session.

Figure 32:
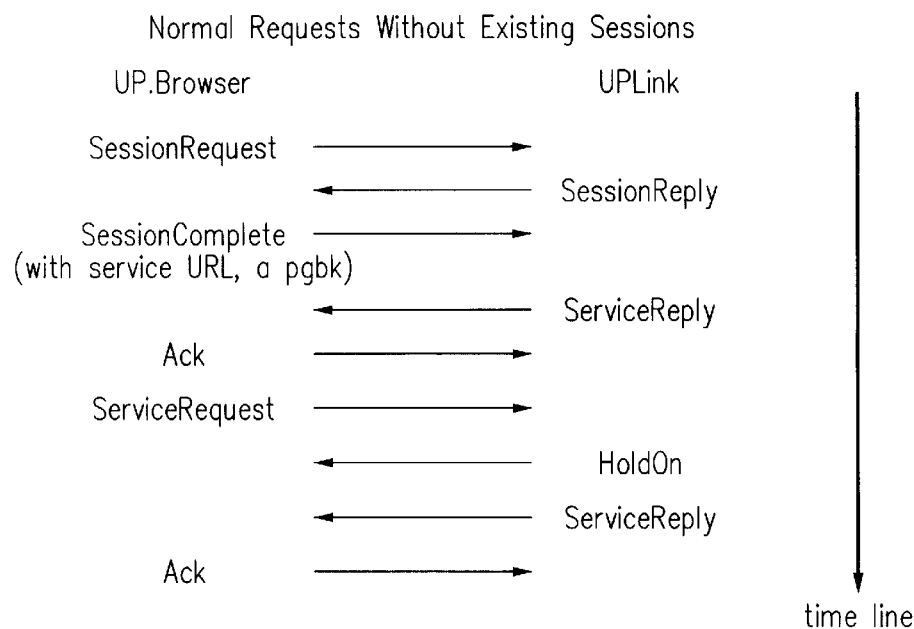
FIG. 32 is a schematic diagram of a request when a session is not yet established.

If there is no session established yet, the browser initiates a session creation with the UP.Link, and optionally sends its first service URL request together with Session Complete request. Once the session is established, the client can make as many service URL requests until the session expires. FIG. 32 shows requests process without an existing session.

Figure 33:
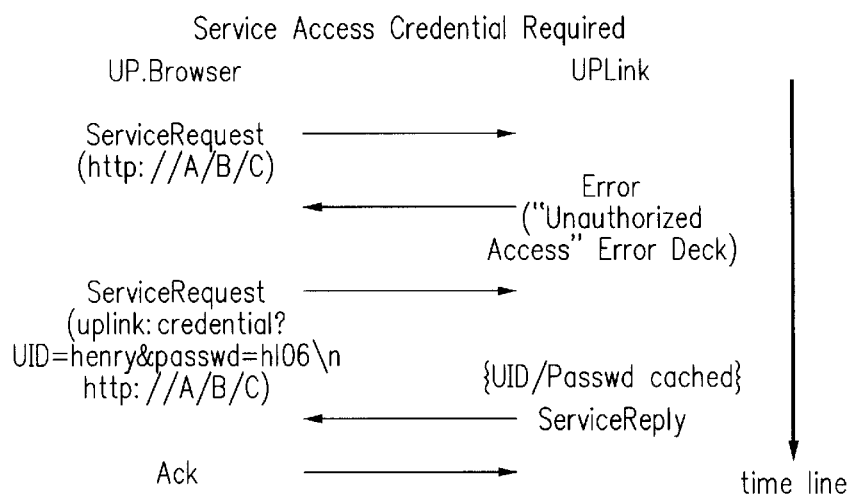
FIG. 33 is a schematic diagram of a re-send process when the service credential is required.

If service credential is required, UP.Browser will re-send the service request with the required credential (e.g.,. UID/Password) upon receiving a "Unauthorized Access" error PDU, which contains an error deck with the URL. A service re-send process when service credential is required is shown in FIG. 33.

2.5.5 Notifications

Figure 34:
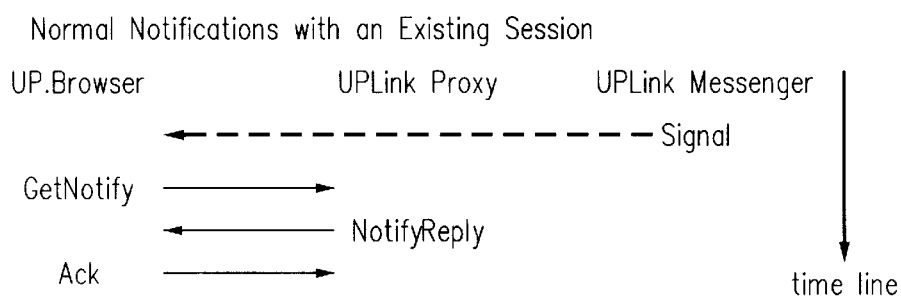
FIG. 34 is a schematic diagram of a notification process.

UP.Link Messenger initiates the notification process by sending a SIGNAL to the client. The entire process is shown below. A notification process is shown in FIG. 34.

Special Situations:
Device Power On or Switch from Voice to Data
If there are no Home URL and time request, the device sends GetNotify PDU to fetch the pending notifications, if any; the notification content is sent to client in Notify Reply;
If there are home URL and/or time request, the device sends ExtSrvRqst PDU with status set to SYNC, which makes UP.Link to check if there is notification pending. If so, the status is set to NTFY in ExtSrvRply PDU to indicate pending notifications.

Multiple Notifications

If there are multiple notifications pending for a subscriber, status can be set to NTFY in Notify Reply to indicate more to fetch. This makes a chained fetching of notifications possible;
Ack can be piggybacked in the next Get Notify PDU to ack the receipt of the last Notify Reply in case of a chained fetch.

2.5.6 Errors

Figure 35:
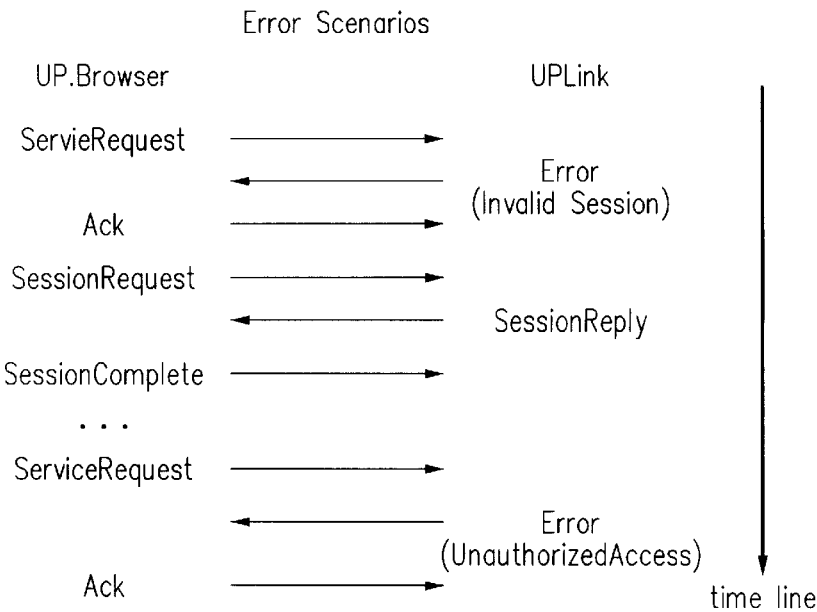
FIG. 35 is a schematic diagram of the events of an error scenario.

UP.Link may return Error PDU's to an UP>Browser if it can not process the request normally. The common errors may include:

Security violation (e.g., authentication failure, message integrity failure);
Security unavailable (e.g., service down)
Unauthorized access (e.g., user/password required);
Invalid session (e.g., session expired);
Invalid service request (e.g., non-exist service URL);
Unsupported version or cipher;
Device not recognized (e.g., not provisioned);

For complete definition and error codes, refers to sugp.h. An error scenario is shown in FIG. 35.

2.5.7 Cancellation

Figure 36:
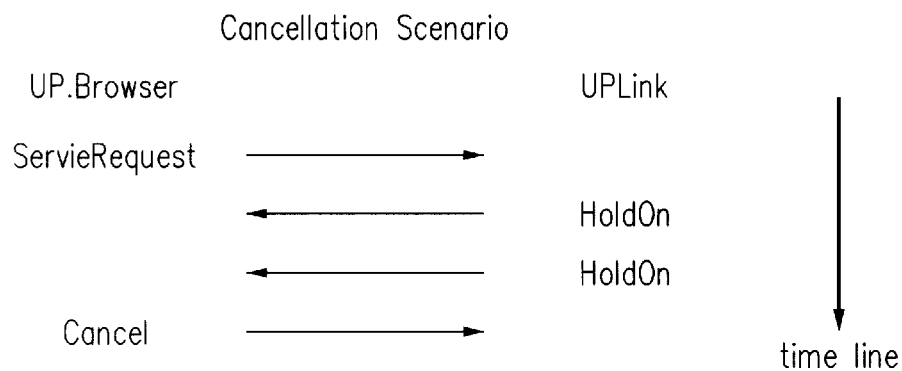
FIG. 36 is a schematic diagram of a cancellation scenario.

UP.Browser may cancel a request at a user's demand. A cancellation scenario is shown in FIG. 36.

2.5.8 Security Violations

Security violations include authentication failure and message integrity failure. The authentication failure will cause both the client and the server terminate the proto-sessions immediately. The message integrity failures are handled below:

When the number of violations exceeds the configurable limit, the server will terminate the session by either marking the session as invalid or remove the session entry from the session table.
The client will request a new session after the number of security violations exceeds the limit. The limit is server configurable and is sent to client as one of the attributes in the Session Reply PDU.

2.6.0 Secure Message Manager

Figure 37:
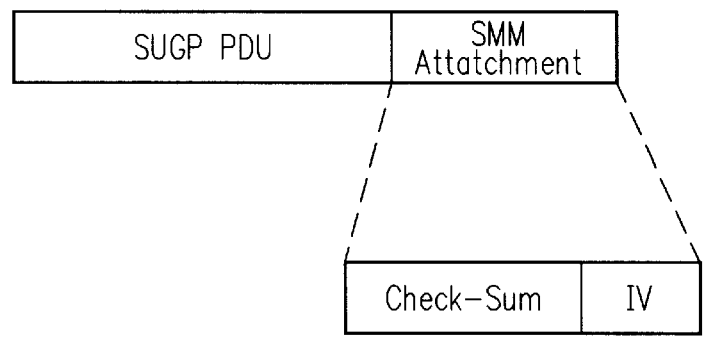
FIG. 37 is a schematic diagram of the structure of an SMM attachment.

Secure Message Manager (SMM) provides the following functionality:

Encrypt/decrypt SUGP protocol PDU's;
Compression;
Validate the message integrity;
Support multiple ciphers;

SMM generates an SMM Attachment for every SUGP PDU. An SMM Attachment is shown in FIG. 37. The role of the attachment is for implementing the above functionality. The SMM Attachment consists of:

Check-Sum: 4 byte[2] check sum of the entire SUGP protocol PDU. It is encrypted.

[2] For smaller PDU's, check-sum can be 2 bytes to limit the whole PDU in one block (8 bytes)

IV: 2 bytes Initialization Value. It is always in plaintext. It is used to support block cipher in CBC mode with Initialization Vector. IV is used to construct an initialization vector of block size. IV in this case is a nonce associated with a session.

2.6.1 Encryption/Decryption

SMM encryption/decryption has the following characteristics:

No data expansion.

Padding Rules:

If the last block is less than the standard block size (8 bytes), it will be added to X number of random bytes, where LastBlock+X=8.

2.6.2 Compression

SMM performs compression before encryption and decompression after decryption. Version 2.0 may not implement this feature. The compression is one-way: UP.Link compresses data and the browser decompresses it to limit code/heap space under budget.

Compression will be performed on digest and bootinfo fields of the reply PDU's. The browser may store the compressed data as is and decompress them on demand.

To take advantage of compression, compression is performed only if the data length exceeds the threshold. The high bit in the type field of PDU body may be used to indicate if the data is in fact compressed.

2.6.3 Message Integrity

SMM uses Check-Sum to enforce message integrity. The check-sum is taken either 4 bytes or 2 bytes, depending on the PDU type. XOR is used to construct the check-sum.

2.6.4 Multiple Cipher Support

SSM can support multiple ciphers, but Version 2.0 expects only one cipher algorithm. The device is expected only one cipher algorithm and it indicates to the server its algorithm and the parameters for the algorithm (e.g., rounds for RC5) at session creation.

The server SSM must support multiple cipher algorithms. It pick up dynamically the appropriate cipher algorithm as required.

2.6.5 Encryption Performance

In order to improve encryption performance, the cipher algorithm implementation (normally in C) for a device may be converted to the assembly language code for the device. In general, such conversion has significant performance improvement.

2.6.6 Encryption Algorithm

Version 2.0 will use RC5 as the encryption algorithm between UP.Browser and UP.Link. RC5 will be used for:

Authentication

Message Privacy

The reasons to select RC5 over RC4

RC5 is small and fast; not as small as and as fast as RC4, but it is all we can find as an alternative for RC4 in terms of code size and speed. The code size of IDEA is not small.

RC5 is a block cipher so that synchronization between UP.Browser and UP.Link is not required. This is ideal for our basic architecture on UDP because UDP is not a reliable transport.

Although RC4 can be configured to handle message losses, the overhead and complexity for loss recovery is very significant.

RC4 requires at least 516 bytes of persistent storage for storing its states (S-boxes) if the shared secret key can be used for creating many sessions over a long period of time (e.g., 4 years).

RC5 is part of RSA's BSAFE product, the most reputable encryption product in the world. Although it is new and about 2 years of life, RSA expects that it will be accepted widely. RSA recommends RC5 over RC2 because it is fast and safer than RC2. RC2 is currently used in many commercial products.

RC5 parameters

RC5 is parameterized as w/r/b, w: logical word size in bits; block size is 2*w;

r: number of rounds;

b: number of bytes in the key;

The higher r, w, and b will provides higher security. However, higher r and w requires more computation time. RSA recommends 32/12/16. The parameters will be determined for V2.0 as the following:

w: 32 bits. This implies the block size is 64 bits (8 bytes).

r: minimum 16.

Server should accept r values between 12–R, where 12<R<255 is a server configurable parameter;

Client is configurable at provisioning time when the shared secret key is provisioned;

Session creation uses 32 rounds for higher security to protect the permanent shared secret key and the current session key exchange;

b: 16 bytes.

5 bytes for international market as required by U.S. Export Law.

2.7.0 Dependencies

Encryption Libraries

Source code licenses for RC5. This is an external dependency.

Diffie-Hellman Library

This is an external dependency. We may need Diffie-Hellman key exchange protocol to perform automatic configuring. The source code license is required. Diffie-Hellman patent will expire on Apr. 29, 1997.

Nonce and Random Number Generation for the Device

To implement authentication, nonce should be generated in the device. Nonce does not require randomness, but requires uniqueness over a long time period (e.g., during life time of a shared secret key). we expect that the Client Group provides support for implementing the nonce.

If Diffie-Hellman is adopted, random number generation is also required.

Device Dependent Driver for UDP

This is the interface for UDP protocol layer. Although PCSI and Mitsubishi phones already have device dependent drivers for UDP, which do not require any changes for Magellan, the Client Group is expected to provide the device dependent UDP drivers if we move to new platforms.

Session Creation and Session Context Management

Both the Browser and the UP.Link must create sessions and maintain session contexts, which contains such items as session keys. Although UP.Browser only has one session, the notion of session exists.

2.8.0 Backwards Compatibility Impact

This version of SUGP protocol is not designed to be compatible with the previous version of the protocol (e.g., UGP) which is used in the version 1.1 and earlier UP products. If the customers want to run previous version of browsers, they are assumed to keep the previous version of UP.Links operational.

However, the protocol provides a version control mechanism so that the protocol may be implemented both backward compatible and forward compatible in the future.

2.9.0 Performance Impact

Due to the overhead for encryption and decryption in both UP.Browsers and UP.Links. It is expected that the system will be slower if it is measured in milliseconds. However, the slowdown may not be significantly noticeable by the browser users.

According to our own bench marking test for RC5 32/16/16, a single CPU SUN Ultra is able to encrypt (or decrypt) 1000 KB data per second. If we assume the following:

- phone device is 250 times slower than an Ultra in speed, which implies 4 Kbytes encryption per second;
- average user makes a request every 3 seconds with average data 300 bytes;
- UP.Link is configured such that a single Ultra CPU will handle 100 requests / sec;
- RC4 is used for SSL. RC4 can run 2 times faster than RC5;

We may have the following estimation of performance overhead:

- phone devices may have 2.5% overhead, which means that for every 3 seconds time interval, 0.075 seconds or 75 milliseconds are used for encryption.

UP.Link may have total 4.5% overhead, which includes both encryption between the phone device and UP.Link and encryption between the UP.Link and the service (Web). That overhead means that for every second, the UP.Link spends 0.05 seconds or 50 milliseconds to perform encryption.

What is claimed is:

1. A method for processing data pushed over a network from a data source or sources to a data destination or destinations via a computer system intermediate between the source or sources and the destination or destinations, wherein the intermediate computer system communicates with the source or sources and destination or destinations over the network, the method comprising:
    the intermediate computer system receiving data being pushed from a data source to a data destination DE1;
    if the intermediate computer system is unable to forward the pushed data to the destination DE1 for a predetermined length of time, then the intermediate computer system deleting the pushed data and never forwarding the pushed data to the destination DE1.

2. The method of claim 1 further comprising the destination DE1 pulling the data that has been pushed to the destination but deleted at the intermediate computer system.

3. A computer system comprising circuitry and one or more computer instructions for serving as an intermediate computer system through which data are pushed over a network from a data source or sources to a data destination or destinations wherein the intermediate computer system communicates with the source or sources and destination or destinations over the network, the circuitry and the one or more computer instructions being for:
    the intermediate computer system receiving data being pushed from a data source to a data destination DE1;
    if the intermediate computer system is unable to forward the pushed data to the destination DE1 for a predetermined length of time, then the intermediate computer system deleting the pushed data and never forwarding the pushed data to the destination DE1.

4. A computer readable medium comprising one or more computer instructions for being executed by an intermediate computer system through which data are pushed over a network from a data source or sources to a data destination or destinations, wherein the intermediate computer system communicates with the source or sources and destination or destinations over the network, the one or more computer instructions being for:
    the intermediate computer system receiving data being pushed from a data source to a data destination DE1;
    if the intermediate computer system is unable to forward the pushed data to the destination DE1 for a predetermined length of time, then the intermediate computer system deleting the pushed data and never forwarding the pushed data to the destination DE1.

5. The method of claim 1 wherein the destination DE1 is a mobile device.

6. A method for processing data pushed over a network from a source or sources to a destination or destinations via a computer system intermediate between the source or sources and the destination or destinations, wherein the intermediate computer system communicates with the source or sources and destination or destinations over the network, the method comprising:
    the intermediate computer system receiving data being pushed to a destination DE1;
    the intermediate computer system receiving a command to delete the data if the data has not yet been forwarded to the destination DE1;
    if the data has not yet been forwarded to the destination DE1, then the intermediate computer system deleting the data and never forwarding the data to the destination DE1.

7. The method of claim 6 wherein the command is received over the network from a source that was pushing the data.

8. A computer system comprising circuitry and one or more computer instructions for serving as an intermediate computer system through which data are pushed over a network from a source or sources to a destination or destinations, wherein the intermediate computer system communicates with the source or sources and destination or destinations over the network, the circuitry and the one or more computer instructions being for:
    the intermediate computer system receiving data being pushed to a destination DE1;
    the intermediate computer system receiving a command to delete the data if the data has not yet been forwarded to the destination DE1;
    if the data has not yet been forwarded to the destination DE1, then the intermediate computer system deleting the data and never forwarding the data to the destination DE1.

9. A computer readable medium comprising one or more computer instructions for being executed by an intermediate computer system through which data are pushed over a network from a source or sources to a destination or destinations wherein the intermediate computer system communicates with the source or sources and destination or destinations over the network, the one or more computer instructions being for:
    the intermediate computer system receiving data being pushed to a destination DE1;
    the intermediate computer system receiving a command to delete the data if the data has not yet been forwarded to the destination DE1;
    if the data has not yet been forwarded to the destination DE1 then the intermediate computer system deleting the data and never forwarding the data to the destination DE1.

10. A method for processing data pushed over a network from a source or sources to a destination or destinations via a computer system intermediate between the source or sources and the destination or destinations, wherein the intermediate computer system communicates with the source or sources and destination or destinations over the network, the method comprising:

the intermediate computer system receiving data DA1 being pushed to a destination or destinations, wherein the pushed data DA1 includes an identifier identifying a source of the pushed data;

if the identifier of the pushed data DA1 matches an identifier of data pushed earlier to the same destination or destinations but not yet forwarded to at least one of its destination or destinations, then the intermediate computer system deleting the earlier pushed data and never forwarding the earlier pushed data to the destination or destinations.

11. The method of claim 10 wherein the data DA1 is a more recent version of the earlier pushed data.

12. A computer system comprising circuitry and one or more computer instructions for serving as an intermediate computer system through which data are pushed over a network from a source or sources to a destination or destinations, wherein the intermediate computer system communicates with the source or sources and destination or destinations over the network the circuitry and the one or more computer instructions being for:

the intermediate computer system receiving data DA1 being pushed to a destination or destinations, wherein the pushed data DA1 includes an identifier identifying a source of the pushed data;

if the identifier of the pushed data DA1 matches an identifier of data pushed earlier to the same destination or destinations but not yet forwarded to at least one of its destination or destinations, then the intermediate computer system deleting the earlier pushed data and never forwarding the earlier pushed data to the destination or destinations.

13. A computer readable medium comprising one or more computer instructions for being executed by an intermediate computer system through which data are pushed over a network from a source or sources to a destination or destinations, wherein the intermediate computer system communicates with the source or sources and destination or destinations over the network, the one or more computer instructions being for:

the intermediate computer system receiving data DA1 being pushed to a destination or destinations, wherein the pushed data DA1 includes an identifier identifying a source of the pushed data;

if the identifier of the pushed data DA1 matches an identifier of data pushed earlier to the same destination or destinations but not yet forwarded to at least one of its destination or destinations, then the intermediate computer system deleting the earlier pushed data and never forwarding the earlier pushed data to the destination or destinations.

14. A method for operating a server to provide data over a network, the method comprising:

the server pushing data to a data destination or destinations by sending the data over the network to an intermediate computer system which is to forward the data over the network to the data destination or destinations; and the server sending a command to the intermediate computer system to delete data which the server pushed earlier, the command being a command to delete the data if the data has not yet been forwarded to its destination.

15. The method of claim 14 wherein at least one of the destinations whose data are to be deleted if not yet forwarded is a mobile device.

16. A server programmed to perform the following operations:

pushing data to a data destination or destinations by sending the data over a network to an intermediate computer system which is to forward the data over the network to the data destination or destinations; and sending a command to the intermediate computer system to delete data which the server pushed earlier, the command being a command to delete the data if the data has not yet been forwarded to its destination.

17. A computer readable medium comprising one or more computer instructions for causing a server to perform the following operations:

pushing data to a data destination or destinations by sending the data over a network to an intermediate computer system which is to forward the data over the network to the data destination or destinations; and sending a command to the intermediate computer system to delete data which the server pushed earlier, the command being a command to delete the data if the data has not yet been forwarded to its destination.

* * * * *